(12) United States Patent
Freier et al.

(10) Patent No.: US 11,371,807 B2
(45) Date of Patent: Jun. 28, 2022

(54) PROTECTIVE MATERIAL HAVING A PROTECTION FUNCTION AGAINST FRAGMENTS, STABBING, CUTTING, FIREARMS AND/OR SHOCKS

(71) Applicant: Blücher GmbH, Erkrath (DE)

(72) Inventors: Katrin Freier, Mönchengladbach (DE); Bertram Böhringer, Wuppertal (DE)

(73) Assignee: BLÜCHER GMBH, Erkrath (DE)

( * ) Notice: Subject to any disclaimer, the term of this patent is extended or adjusted under 35 U.S.C. 154(b) by 141 days.

(21) Appl. No.: 15/741,563

(22) PCT Filed: May 12, 2016

(86) PCT No.: PCT/EP2016/060654
§ 371 (c)(1),
(2) Date: Jan. 3, 2018

(87) PCT Pub. No.: WO2017/005397
PCT Pub. Date: Jan. 12, 2017

(65) Prior Publication Data
US 2018/0188007 A1 Jul. 5, 2018

(30) Foreign Application Priority Data
Jul. 10, 2015 (DE) .......................... 102015008810.6

(51) Int. Cl.
| | |
|---|---|
| *F41H 5/04* | (2006.01) |
| *B32B 5/02* | (2006.01) |
| *D03D 1/00* | (2006.01) |
| *B32B 5/26* | (2006.01) |
| *E04H 15/54* | (2006.01) |

(52) U.S. Cl.
CPC ........... *F41H 5/0485* (2013.01); *B32B 5/024* (2013.01); *D03D 1/0052* (2013.01); *B32B 5/26* (2013.01); *B32B 2571/02* (2013.01); *D10B 2321/0211* (2013.01); *D10B 2331/021* (2013.01); *E04H 15/54* (2013.01)

(58) Field of Classification Search
CPC . F41H 5/16; F41H 5/0485; F41H 3/02; B32B 2571/02; B32B 5/024; B32B 5/026; B32B 2305/18; B32B 2323/04; B32B 2323/043; E04H 15/54; D10B 2321/0211; D10B 2331/021; D03D 1/0052
See application file for complete search history.

(56) References Cited

U.S. PATENT DOCUMENTS 3,648,613 A 3/1972 Cunn
5,269,862 A * 12/1993 Nakajima ............ A01G 9/1438
156/155

(Continued)

FOREIGN PATENT DOCUMENTS

CA 2785888 A1 2/2006
DE 202010000598 U1 6/2010
(Continued)

*Primary Examiner* — Benjamin P Lee
(74) *Attorney, Agent, or Firm* — Edward E. Sowers; Brannon Sowers & Cracraft PC

(57) ABSTRACT

The invention relates to a protective material (1), in particular a textile protective material, having a protection function against fragments, stabbing, cutting, firearms and/or shocks, preferably for the protection and/or covering of articles (2).

19 Claims, 4 Drawing Sheets

(56) References Cited

U.S. PATENT DOCUMENTS

| | | | |
|---|---|---|---|
| 5,356,701 A * | 10/1994 | Wei | B22F 3/002 |
| | | | 442/6 |
| 8,166,569 B1 * | 5/2012 | Chiou | B29C 70/086 |
| | | | 2/2.5 |
| 8,695,112 B2 * | 4/2014 | Bhatnagar | F41H 5/0485 |
| | | | 2/2.5 |
| 8,869,813 B2 | 10/2014 | Kanayama | |
| 9,012,339 B2 * | 4/2015 | Chiou | B32B 5/26 |
| | | | 442/111 |
| 10,072,361 B2 * | 9/2018 | Thomson | D03D 15/08 |
| 2003/0228815 A1 * | 12/2003 | Bhatnagar | D03D 1/0052 |
| | | | 442/164 |
| 2004/0261465 A1 * | 12/2004 | Yarborough | A41D 19/015 |
| | | | 66/169 R |
| 2008/0064280 A1 | 3/2008 | Bhatnagar et al. | |
| 2009/0126060 A1 * | 5/2009 | Jacobs | B29C 70/20 |
| | | | 2/2.5 |
| 2013/0061739 A1 * | 3/2013 | Cheong | F41H 5/007 |
| | | | 89/36.02 |
| 2013/0213208 A1 | 8/2013 | Compton et al. | |
| 2013/0213308 A1 | 8/2013 | Koskey, Jr. | |
| 2013/0219600 A1 | 8/2013 | Atorrasagasti et al. | |
| 2014/0165251 A1 * | 6/2014 | Prickett | D02G 3/442 |
| | | | 2/2.5 |
| 2016/0017521 A1 * | 1/2016 | Thomson | D03D 15/08 |
| | | | 66/171 |
| 2016/0145777 A1 * | 5/2016 | Ji | D03D 15/0088 |
| | | | 139/420 A |
| 2017/0029989 A1 * | 2/2017 | Tuscia | D04B 1/16 |
| 2017/0176146 A1 * | 6/2017 | Bohringer | F41H 5/0485 |
| 2017/0314894 A1 * | 11/2017 | Tunis, III | B32B 5/12 |
| 2018/0066921 A1 * | 3/2018 | Wagner | B32B 3/266 |

FOREIGN PATENT DOCUMENTS

| | | |
|---|---|---|
| DE | 112010005258 T5 | 5/2013 |
| DE | 102012110104 A1 | 6/2014 |
| EP | 0310199 A1 | 4/1989 |
| EP | 2199728 A1 | 6/2010 |
| GB | 2504539 A | 2/2014 |
| WO | 03053676 A1 | 7/2003 |
| WO | 2011099936 A1 | 8/2011 |
| WO | 2014060094 A1 | 4/2014 |

\* cited by examiner

PROTECTIVE MATERIAL HAVING A PROTECTION FUNCTION AGAINST FRAGMENTS, STABBING, CUTTING, FIREARMS AND/OR SHOCKS

CROSS-REFERENCES TO RELATED APPLICATIONS

This application is a National Stage filing of International Application PCT/EP 2016/060654, filed May 12, 2016, "Protective Material Having A Protection Function Against Fragments, Stabbing, Cutting, Firearms and/or Shocks", claiming priority to DE 10 2015 008 501.8 filed Jul. 3, 2015, and to DE 10 2015 008 810.5 filed Jul. 10, 2015. The subject application claims priority to PCT/EP 2016/060654, to DE 10 2015 008 501.8, and to DE 10 2015 008 810.5, and incorporates all by reference herein, in their entirety.

BACKGROUND OF THE INVENTION

The present invention relates to the technical field of specifically textile protective materials designed for military deployment in particular and providing/ensuring a protection for specifically military articles from forces (of an explosion) and/or from ballistic objects/projectiles, especially in the form of fragments or the like, but also from cutting weapons, stabbing weapons and thrusting weapons.

The present invention more particularly provides a protective material, especially a textile type protective material offering fragment, stab, cut, ballistic projectile and/or thrust protective resistance, wherein the protective material of the present invention is deployed for protecting/for covering or hiding articles, especially military articles.

The present invention similarly relates to the use of the specifically textile protective material according to the invention for providing/enhancing a fragment, stab, cut, ballistic projectile and/or thrust protection for articles and/or for endowing articles with fragment, stab, cut, ballistic projectile and/or thrust protection.

The present invention similarly relates to a method of providing and/or enhancing a fragment, stab, cut, ballistic projectile and/or thrust protection for at least one specifically military article and/or of endowing the underlying article with the protective properties just recited.

The present invention additionally also relates to a protective material unit as such, which comprises at least one article endowed/at least partly covered with the protective material of the invention.

Explosive devices leading to the explosive-type release of fragments and also the effect of ballistic objects as emanating for example from firearms or the like represent a major hazard and are one of the main risk factors in military warfare zones and also trouble spots marked by terrorist activity, particularly since fragment-releasing explosive devices are difficult to police as regards their distribution and are relatively simple to manufacture in some cases, so even nonmilitary persons prepared to use force, such as terrorists or the like, are capable of manufacturing and deploying explosive devices of this type. The specifically explosive release of fragments and/or ballistic objects not only represents a major hazard to persons deployed in the military sector and also in the field of terrorism defense, such as soldiers in military units, border guards, police officers, security personnel or the like but also leads to an acute or at least latent risk of damage for articles/objects used in the course of the military and/or terrorism defense deployment, such as military pieces of equipment, vehicles, weapons, military equipments or the like, i.e., also for articles, especially in planning and coordination centers or living quarters, that are similarly related to the deployment.

The impact of fragments and/or ballistic objects may result for example in destruction of the equipments and/or in the outer wall of the article in question being penetrated, entailing a consequent destruction of the article as such. In addition, persons for example inside transportation vehicles or the like may be perhaps lastingly injured by penetrating fragments/objects.

An acute threat in this context for articles/objects as deployed in military deployment and/or for terrorism defense resides in improvised explosive devices (IEDs). Explosive devices of this type have evolved into a subtle instrument of warfare and/or terrorist actions with a high destructive potential.

The primary and secondary fragments released/caused by an IED explosion are caused by the substantial acceleration to propagate through space at high speed, leading to a correspondingly high destructive potential, since the underlying fragments are able for example to penetrate through the skin, walls and shells of space-defining objects and/or of the articles in question and thus also able to impact the interior of the articles/objects, possibly entailing a consequent injury of persons present in an object.

Improvised explosive devices are therefore also associated with a high level of hazard potential because they are often made without major technical sophistication and may in this context also vary in material, size and also appearance, adding to the difficulty of their localization and identification. In addition, improvised explosive devices often develop enormous destructive power, particularly as a consequence of the explosive-type release of primary and secondary fragments by emanation of a powerful pressure wave on the one hand and also of fire and heat on the other.

In general, the way improvised explosive devices work is that explosive materials are ignited to cause the explosive device to burst, entailing the explosive-type release of primary fragments which together with the simultaneously created pressure wave emanate at high speed from the site of explosion. In addition, the pressure wave and the resultant primary fragments can lead to the subsequent release of secondary fragments, often in the form of (micro)particles, such as dirt, dust and sand, as well as fragments of destroyed objects from the direct and/or indirect surroundings of the site of the explosion of the explosive device. These secondary fragments may for example also come from materiel items (such as vehicle interiors) or the like, destroyed by the explosion, potentially leading to consequent injury for for example persons in the vehicle.

Owing to the way improvised explosive devices work, involving the explosive release of fragment (projectiles), such explosions may cause even initially only indirectly affected persons to suffer occasionally large area and serious injuries, resulting particularly from the penetration of primary and secondary fragments into the body, but also due to the pressure wave emanating from the explosion and/or the exposure to fire and heat, but particularly also as a consequence of the destruction of the article/object, for example a vehicle or the like, exposed to the explosion.

In addition to the casualties, and the associated losses, caused by the IED explosions in question, the destruction of articles/objects deployed in military deployment and/or terrorism defense constitutes a major issue since because of the resulting materiel losses the deployment strength/force may be lastingly reduced.

The articles/objects in question may be generally for example, as will be detailed hereinbelow, technical, mechanical or electronic articles and particularly military vehicles, machines, weapons, ammunition, spares, electronic articles, accessories, installations, facilities, outfits or the like. High-technology and hence sensitive equipments are concerned here in some instances, so there is also a great need for that reason to protect such articles from explosion impact, especially of the aforementioned kind.

A high danger similarly also emanates in this context from those explosions which are due to the ignition of explosive materials in an underlying space of an article/object, as is the case for example with vehicle bombs or the like, since the resultant forces of explosion in the event of an ignition propagate outward from the article/object and the attendant release of fragments can impact the environment of the exploding object unhinderedly, which can lead to corresponding, perhaps lasting destructions, and this also entailing personal injury.

Articles/objects deployed specifically in military deployment and/or terrorism defense, in addition to being hazarded by the abovementioned explosively released fragments and/or ballistic objects, are further also hazarded by induced stabbing, cutting and/or thrusting effects as may be caused for example by the deployment of cutting and/or stabbing weapons, such as knives or of thrusting weapons, such as corresponding (clubbing) weapons. They too can destroy such an article in a lasting manner, and any penetration resulting therefrom may similarly result in an injury to a person present in the article/object affected, for example a vehicle or the like.

The above observations altogether demonstrate that there is a high need in the prior art for providing an effective protective system in the form of a protective material which provides a protective effect against fragments released by explosion/detonation and/or a further-reaching protection against stabbing, cutting and thrusting and which combines good handlability and flexible performance characteristics with a large area and also individually adjustable protection for corresponding articles/objects as deployed for example in the context of a military deployment and/or in terrorism defense.

Existing protective systems fail to meet the high requirements of such materials—not only as regards their protective performance but also as regards their handlability, individual adjustability to the article to be protected and also their durability.

Existing protective devices and/or systems in some instances have the further disadvantage that they have rigid and/or nonflexible structures, which severely compromises their transportability and also individual adjustability to the article to be protected. Moreover, such systems are not readily foldable, so the material is in some instances not ideally stowable/storable.

EP 1 229 298 A1 relates to a protective element in the form of a blanket-type construction comprising strong fibers and containing cavities and/or chambers filled with at least one hollow body. The focus is predominantly on the deployment of aramid fibers.

The prior art in this context and regarding the provision of a certain level of protection against bodies released explosively and/or a certain level of stab and/or thrust protective performance is further for example also geared to the deployment of materials to form structures based on para-aramid (interchangeably also known as poly(p-phenylene-terephthalamide) (PPTA). Such systems based on para-aramid do admittedly have a certain level of strength, impact resistance and also elongation at break and hence in principle some suitability for use as a fragment protection material, but there is a central disadvantage with para-aramids in that they are neither UV-stable nor moisture-stable, and therefore corresponding materials based on para-aramids lose their strength properties, and hence their protective function, on exposure to UV radiation and/or moisture, such as washing and/or rain water. Fibers/yarns/threads based on para-aramid further have but a low level of breaking strength at right angles to their longitudinal axes, which is disadvantageous particularly for processing these materials into corresponding textile sheet materials, since bending may provoke yarn/fiber breakage. In order to offset this disadvantage, para-aramids are in principle deployable in the form of a staple fiber yarn, but yarns of this type have numerous interruptions in their fibrous structure, adversely affecting the stability and hence the ballistic resistance of the resulting textile sheet material. Abrasion resistance is also down, which is similarly disadvantageous with regard to their durability/stability.

Given the disadvantages of the prior art, there continues to be a high need to protect the underlying articles/objects from fragment exposure and the like in a lasting and efficient manner, since the underlying articles, such as military pieces of equipment and also military materiel, are generally in and of themselves but inadequately endowed with such a protective function. It must also be borne in mind here that the articles to be protected are often highly complex and hence sensitive to mechanical and/or physical influences, while the underlying articles are often also associated with high costs of procurement and in addition a high degree of functional reliability in the employment scenario (e.g., battlefield deployment and/or terrorism defense or the like) is required to ensure an overall success, and this also with regard to ensuring the safety of the deployed personnel in question.

Altogether, therefore, there is an immense need to provide a specific protective material which while providing high protection against fragments released by detonation/explosion also offers protection therebeyond against stabbing, cutting and thrusting, while the protective material shall be readily transportable and easily handlable and shall moreover be universally deployable in relation to a multiplicity of various articles to be protected, while in addition making possible a protective function which is individually adaptable and/or adaptive in relation to the underlying threat situation.

BRIEF SUMMARY OF THE INVENTION

It is against this background that the present invention therefore addresses the problem of making available an efficient concept for providing a protective material wherein the above-described disadvantages of the prior art shall be at least substantially avoided or else at a minimum ameliorated.

The problem addressed by the present invention is more particularly that of providing a protective material which, over the prior art, has an improved protective function, specifically ballistic protective function, particularly against fragments released by detonation/explosion and/or against ballistic bodies/objects in general. The protective material provided according to the present invention shall here also have a high protective function against the penetration particularly of cutting and stabbing/thrusting weapons, such as knives, axes or the like, so the present invention shall also make it possible to provide such a protective material which additionally has a high protective effect against stabbing, cutting and thrusting.

The protective material of the present invention shall further have a high degree of adjustability in relation to the shape of the article to be protected, while the protective material shall also have a high degree of stability, especially with regard to moisture and UV radiation, so the protective effect is also ensured for long periods.

The protective material shall particularly also have good handlability, not only in relation to the employment/deployment properties but also in relation to the stowing/transporting properties of the material.

There shall more particularly be provided altogether a protective material which is further individually adaptable/configurable and wherein the protective function is individually adaptable/custom tailorable. In this context, the invention shall also ensure a rapid configuration/adaptability of the protective function under deployment conditions for example.

The problem addressed by the present invention is similarly in turn further that of providing a corresponding protective material where the underlying protection is individually adjustable particularly with regard to portions/regions of the article/object to be protected that are specifically to be protected, in particular also with regard to the underlying potential threat, but also with regard to the geometry and/or dimensions of the object/article to be protected.

The problem addressed by the present invention is therefore that of providing such a protective material on whose basis the effects of—in the event of a military or terrorist attack for example—ballistically effective objects, penetrating objects deployed/released or else of an ignition of explosive materials in a confined space on articles to be protected are at least ameliorated and/or reduced, resulting in enhanced protection being provided overall.

To solve the above-described problem, therefore, the present invention proposes—in a first aspect of the present invention—a protective material, in particular a textile type protective material offering fragment, stab, cut, ballistic projectile and/or thrust protective resistance, preferably for protecting and/or for covering or hiding and/or for lining articles/objects, as described herein; further advantageous developments and elaborations of this aspect of the present invention form in each case part of the subject matter relating to the protective material.

The present invention yet further provides—in a second aspect of the present invention—the method of using at least one protective material, especially a textile protective material, for providing and/or enhancing a fragment, stab, cut, ballistic projectile and/or thrust protection for articles/objects and/or for endowing articles/objects with the protective properties listed above as further described herein in this regard; further advantageous developments and elaborations of this aspect of the present invention form in each case part of the subject matter relating to the use method of the present invention.

The present invention further provides—in a third aspect of the present invention—a method of providing and/or enhancing a fragment, stab, cut, ballistic projectile and/or thrust protection for at least one article/object and/or of endowing at least one article/object with a corresponding protection, described in this regard.

The present invention lastly further provides—in a fourth aspect of the present invention—a protective material unit, which comprises at least one protective material according to the invention and an article endowed with the protective material and/or at least partly covered and/or lined with the protective material, relating to the protective material unit.

It will be readily understood that, in the hereinbelow following description of the present invention, such versions, embodiments, advantages, examples or the like as are recited hereinbelow in respect of one aspect of the present invention only, for the avoidance of unnecessary repetition, self-evidently also apply mutatis mutandis to the other aspects of the present invention without the need for any express mention.

It will further be readily understood that any values, numbers and ranges recited hereinbelow shall not be construed as limiting the respective value, number and range recitations; a person skilled in the art will appreciate that in a particular case or for a particular use, departures from the recited ranges and particulars are possible without leaving the realm of the present invention.

Moreover, any hereinbelow recited value/parameter particulars or the like can in principle be determined/quantified using standard/standardized or explicitly recited methods of determination or else using methods of determination/measurement which are per se familiar to a person skilled in the art. Unless otherwise indicated, the underlying values/parameters are determined under standard conditions (i.e., particularly at a temperature of 20° C. and/or at a pressure of 1013.25 hPa or 1.01325 bar).

As for the rest, any hereinbelow recited relative/percentage, specifically weight-based, recitations of quantity must be understood as having to be selected/combined by a person skilled in the art within the context of the present invention such that the sum total—including where applicable further components/ingredients, in particular as defined hereinbelow—must always add up to 100% or 100 wt %. However, this is self-evident to a person skilled in the art.

Having made that clear, the present invention will now be more particularly described and this also by means of drawings/figures depicting preferred and/or exemplary embodiments.

The context of elucidating these preferred and/or exemplary embodiments of the present invention, yet which are not in any way limiting in respect of the present invention, will also be used to point out further advantages, properties and features of the present invention.

DETAILED DESCRIPTION OF THE INVENTION

Figure 1A:
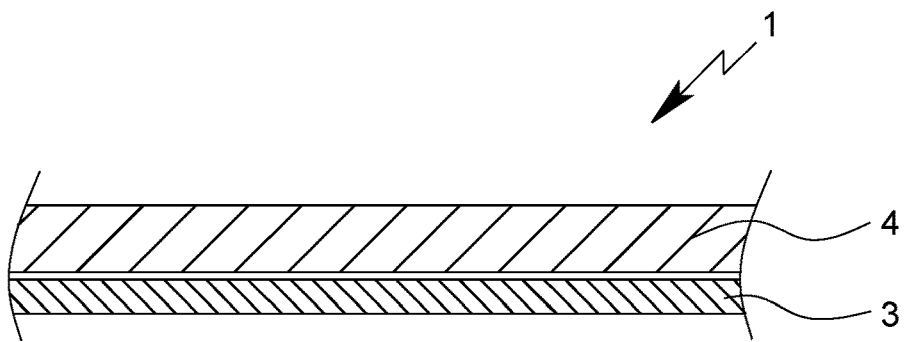
FIG. 1A shows a cross-sectional depiction through a protective material of the present invention and/or through a supplementary fragment protection element having a single-ply construction and having a supplementary textile covering material and/or layer.

The present invention thus provides—in a first aspect of the present invention—a protective material, in particular a textile type protective material offering fragment, stab, cut, ballistic projectile and/or thrust protective resistance, preferably for protecting and/or for covering or hiding and/or for lining articles, wherein the protective material is configured as sheetlike and/or two-dimensional textile material, preferably in the form of a large-area coherent, specifically one-piece textile fabric, preferably in the form of a cover, of a cloth, of a sheet, of a blanket, of a tarpaulin, of a mat or the like, wherein the textile material is configured and/or present as a woven fabric, as a non-crimp fabric, as a bonded textile fabric, in particular as a nonwoven fabric, as a loop-formingly knitted fabric or as a weft-knitted fabric produced with independently-movable needles, in particular as a knitted fabric, preferably as a weft-knitted fabric produced with independently-movable needles, and wherein the textile material includes or consists of at least one ultra high molecular weight polyethylene (UHMW-PE), wherein the ultra high molecular weight polyethylene (UHMW-PE) is present as yarn and/or thread and/or strand, preferably filament yarn, and serves and/or is used to configure and/or constitute the protective material.

This is because the applicant has now found that, completely surprisingly, the protective material of the present invention, which is more particularly present in the form of a textile type protective material, will afford, in a purpose-directed manner, an effective form of fragment, stab, cut, ballistic projectile and/or thrust protection by deploying, in a purpose-directed manner, a very specific textile material based on a material specifically envisaged for this (while also achieving a high protective performance against fragments released by detonation/explosion and also against ballistic bodies, such as projectiles or bullets of the type emanating from firearms for example and additionally also against penetrating objects and/or cutting, stabbing and thrusting weapons, such as knives, axes or the like). Moreover, the protective performance of the protective material according to the present invention may be further advanced through an individual elaboration and/or through the purpose-directed use of supplementary fragment protection devices.

The term "fragment protection" as used according to the present invention is to be understood as having a very broad meaning and as relating more particularly to the providing of a protective function against the penetration of ballistic projectiles released directly or indirectly by detonation/explosion, particularly said ballistic projectiles in the form of fragments which are more particularly notable for small particle sizes and for an irregular shape, and which more particularly are explosively released in the form of primary and/or secondary fragments in the course of the detonation of improvised explosive devices and hit people exposed to the detonation at high speed and/or kinetic energy. Correspondingly, the term "ballistic projectile protection" as used according to the present invention relates more particularly to the providing of a protective function against the penetration of projectiles/bullets emanating from firearms in particular and/or ballistic bodies from firearms or the like. The term "stab protection" and "cut protection" in the context of the present invention relate more particularly to a protective function against cutting and stabbing weapons having a respectively cleaving and piercing effect. Knives or the like are concerned here for example. In addition, the term "thrust protection" as used in the context of the present use relates more particularly to the providing of a protective function against thrusting weapons, which are more particularly weapons where if deployed accordingly the force is focused and/or concentrated on one point, this generally without piercing and/or penetrating into the body.

The outstanding protective properties of the material according to the present invention enable the concept of the present invention to form the basis for corresponding articles/objects as deployed for example in military deployment or for terrorism defense being effectively protected from penetrating particles and/or from destructive impact of force.

The specific choice of material for the protective material of the invention, especially with regard to the deployment of a specific textile material, and also the specifically one-piece and/or coherent configuration of the textile type protective material combine to provide overall a protective material that is not only simple to manufacture but also simple to handle and universally useful (e.g., as covering or alternatively as lining for articles/objects) and which has altogether excellent protective properties.

The material deployed in the context of the present invention is in fact a very specific material in the form of an ultra high molecular weight polyethylene (UHMW-PE), in particular in the form of a yarn and/or thread and/or strand, to form the textile sheet material deployed in the context of the present invention. This is because the applicant found in this context that, completely surprisingly, the deployment of such a specific material is particularly suitable for forming the protective material according to the invention and has significant advantages over the prior art materials based for example on para-aramids. This is because the ultra high molecular weight polyethylene deployed in the present invention to form the protective material has in the form of yarns/threads/strands a very high tenacity and also a high level of toughness, a high level of breaking and/or bending strength and a very high modulus of elasticity. UHMW-PE is moreover moisture- and UV-resistant, which similarly causes the materials deployed according to the invention to have a high stability to water, entailing a high durability for the ballistic protective function. The material deployed further has very good resistance to chemicals and also an outstanding resistance to bacteria.

It is similarly very surprising in this context that particularly good protective effects are obtained when the ultra high molecular weight polyethylene deployed according to the invention and/or the yarns/threads/strands present in this context are used in the form of a woven fabric, a non-crimp fabric, a bonded textile fabric or a knitted fabric, such as a loop-formingly knitted fabric or a weft-knitted fabric produced with independently-movable needles, for the protective material of the present invention. This is because this basis results in extremely strong textile materials and/or systems which together make possible high protective performance of the material in the manner of the present invention, and this not only in relation to fragments and/or ballistic objects but also in relation to the deployment of specific weapons.

It must further also be pointed up that the protective material of the present invention is by virtue of its high adaptability and universality deployable for a large multiplicity of various articles/objects—and this not only with regard to different sizes but also with regard to different shapes on the part of the articles/objects to be protected.

Based on the specific technical measures provided according to the present invention, the protective material and/or penetration protection for underlying articles which is afforded according to the present invention is more particularly a high-strength textile fabric for protecting against the impact of forces/bodies on articles to be protected and/or on specifically space-defining objects. The protective material of the present invention is designed to protect against the penetration and destruction of corresponding (outer) surfaces/materials of articles/objects to be protected.

The protective material which the invention provides in the form of high-strength textile material here protects in particular also from external mechanisms of destruction which lead to penetration and/or destruction of the article and additionally also can destroy any contents of the article/object. The protective material provided by the invention in the form of a high-strength textile fabric additionally also protects from internal, so to speak, mechanisms of destruction, as from a detonation/explosion inside an article (e.g., ammunition container) and/or spaces/objects surrounded by corresponding walls and/or outer delimitations, protecting not only the object in question but also the immediate environment in an appropriate manner.

This protective function provided according to the present invention is obtained through the precise and mutually aligned cooperation between specific properties on the basis of the foundational materials employed, the nature of the fabric construction and also the manner of integration into an article and/or the endowment of an article to be protected. As far as the simple handlability/employment of the protective material according to the present invention is concerned, the protective material may, nonlimitingly, simply be laid for example across an article to be protected, so the protective material is present for example between the explosion/detonation site on the one hand and the article to be protected on the other (amounting so to speak to "protection from out to in"). The protective material may further also be integrated in the article as such and/or be a solid constituent of the article as such, for example in the form of liners or the like, so this is another way of realizing an individual form of the protective function (so to speak "protection from in to out").

Altogether, the protective material of the present invention leads to a multiple form of protection for the article/object to be protected, three aspects in this regard now being foregrounded in a nonlimiting manner and merely by way of example:

The protective material of the present invention leads in the employment scenario to a reduction in and/or lessening of forces/destructive energies acting from ballistically effective bodies, such as fragments or bullets, on an article to be protected. The protective material of the present invention thus ensures comprehensive protection even against IED-based effects of an explosion. The number of penetrating ballistic objects, such as IED-based fragments, and/or their depth of penetration are significantly reduced on this basis in that a multiplicity of particles are even completely stopped from penetrating into the article to be protected. The effects of the pressure wave associated with the explosion are also reduced. More particularly, an effective absorption of energy results with regard to penetrating primary and secondary fragments, so the effect of fragments which do penetrate is much weakened.

This leads to high-grade protection for the article/object to be protected as such and additionally also for further articles and also persons connected to and/or located inside the object, for example vehicle occupants in the case of vehicles as the specific article to be protected. In consequence, the injury pattern of affected persons is also ameliorated indirectly (namely via the primary protection for the article/object), similarly reducing direct effects and long term sequelae of any injuries. As a result of the protective material retaining a large proportion of the particles/fragments impacting on the article/object to be protected, the destruction of the article/object to be protected decreases, preserving its functionality and employability, which also leads to reduced repairs, particularly since the concept of the present invention will retain even microparticles, which is of immense significance particularly also with regard to highly sensitive electronic instruments or the like.

By providing an additional stab, cut and thrust protection, the present invention also reduces the effect/penetration of cutting and stabbing weapons and/or of thrusting weapons, as deployed for example in the course of direct attacks, which similarly serves to prevent any destruction of articles/objects to be protected and/or any injury to persons present therein.

What the protective material of the present invention prevents in this context is the deployed weapons from penetrating, but at a minimum from completely passing through the material and/or for example through the outer walling of an article/object to be protected, this similarly serving to reduce the risk of the article/object being destroyed and also the risk of persons present in an object being injured.

This protective property likewise leads to the technical intactness and/or to the preservation of functionality for the articles/objects to be protected, minimizing any repairs. The protective material of the present invention altogether also ensures an effective form of cut and/or stab protection.

In principle, the protective material of the present invention is also useful for example as an integral constituent, for example in the form of an inner liner or the like, of an article/object to be protected, for example (residential) quarters, storage containers and/or collection containers for explosive materials, for example ammunition, or the like. In the event of an explosion/ignition of explosive substances in the underlying interior of the article/object, the protective material of the present invention provides protection for the exterior by preventing fragments or the like emanating from the interior of the article/object penetrating and/or passing through in the outward direction.

The concept of the present invention also ensures in this connection that enhanced protection is provided for persons who are wearing such articles/objects endowed with the protective material of the present invention, for example ammunition collection containers or the like, on the body.

Articles/objects endowed/lined with the protective material of the present invention, such as ammunition collection containers, additionally reduce the risk of flashover to further explosive substances and their collection containers in the surroundings of the protected article and a consequent chain reaction, particularly since the outwardly directed effect radius in the event of an explosion in the interior of the object/article is reduced. In addition, the penetration depth for fragments and/or ammunition particles is also reduced in corresponding fashion.

The present invention is additionally notable for further properties and advantages, as adduced in what follows:

The protection afforded by the protective material according to the present invention is provided via a specific textile material based on an ultra high molecular weight polyethylene, because this leads to a ballistic protective, multifunctional high-strength material. The protective function is thus provided by a specific textile fabric and/or textile material. According to the present invention, in relation to an article to be protected, the textile material and/or the subject invention protective material can be integrated in an article (as an inner liner for example) and/or be applied thereto (as a protective tarpaulin/blanket for example).

The protective material of the present invention meets the requirements of a ballistic type fragment protection while further and additionally also providing a high level of cut, tear, thrust and stab resistance. The effects of a pressure wave resulting from a detonation/explosion are also minimized.

The energy absorption ability of the protective material according to the present invention also reduces the magnitude of the forces which arise. The protective properties are realized by the high tenacity, by the high modulus of elasticity, the high toughness and breaking extension, the high flexural strength relative to the longitudinal and transverse yarn axis and also a marked and high level of abrasion resistance for the foundational material in the form of the ultra high molecular weight polyethylene deployed according to the present invention.

The concept of the present invention allows the level of protection to be individually established and/or enhanced, for example by precisely aligning/selecting the material mass density, the use of two or more plies and/or on the basis of multiple type ply constructions and/or by deploying additional fragment protection elements.

The protective material of the present invention offers a durable stability and consistent protective performance. The protective material of the present invention is moisture-resistant and UV-resistant by virtue of the materials deployed and generally has a very high level of resistance to chemicals. Hence it is a further advantage for the present invention that the protective material according to the invention does not have to be protected from exterior influences due to the environment.

The protective material of the present invention is also elastic, extensible, formable and flexible. In this context, the protective material of the present invention can be formed, folded and/or compressed without damaging the structure of the material. On removal of the confining force, moreover, the protective material of the present invention will additionally reassume its original shape. Hence in this respect also the protective performance provided by the protective material according to the invention is consistently and/or durably maintained.

The deployment of the protective material in the form of a textile material, especially as a woven fabric, a non-crimp fabric, a bonded textile fabric, a loop-formingly knitted fabric and more preferably as interlooped materials and/or as weft-knitted fabrics produced with independently-movable needles leads to a further improvement in ballistic stopping power, provided by the textile structure on the basis of a dense, complex and compact configuration for the fabric. In addition, the protective material according to the invention is notable for a very low weight of material, a low thickness of fabric and also a high air transmission rate coupled with a high water vapor transmission rate. The protective material of the present invention further has a high level of dimensional stability.

As noted above, the protective material according to the invention is by virtue of the textile material deployed flexible, stretchable and capable of movement within its structures. These properties are believed, without wishing to be tied to this theory, to lead to an optimal and/or improved form of energy absorption from penetrating objects, achieving a significant reduction in the velocity of penetrating objects and hence bringing about a reduction in the magnitude of the forces emanating from the penetrating object. The stretchability of the protective material according to the invention also enables some conformation/adaptation to the object, for example in the form of a ballistic object and a weapon as defined above, impacting and/or penetrating the protective material. This leads to an increase in the contact time, so the protective material of the present invention is able to absorb more energy, this similarly serving to enhance the penetration protection.

The protective performances and the properties of the protective material according to the present invention are durably maintained altogether, irrespective of ambient/environmental influences and of climatic conditions. Nor is it here in the context of the present invention for the textile protective casing to be endowed for example with an additional protective overcasing or the like, although in principle this is allowed according to the invention.

As noted above, the protective material according to the invention is designed for ease of use overall. The protective material according to the invention is lightweight, robust and hardy and for that reason also simple and rapid to use and afterward also simple to put away again. The protective material may be compressed and/or folded for this without there being any damage present in the product itself, so the corresponding protective properties are also maintained. The protective material of the present invention may further be exposed to direct environmental influences and also changing climatic conditions and their effects without any damage resulting to the product, so the protective performance is durably maintained for that reason as well.

In addition, the protective material of the present invention is outstandingly adaptable with regard to the object/article to be protected, ensured in particular also by the high flexibility due to the corresponding material-related properties. Especially the structure, cut and/or processing of the protective material and also of any supplementary fragment protection elements present have been chosen such that the protective material is as a whole optimally conformable to the shape of an article/object to be protected. This, in the employed state of the protective material, leads to an avoidance of severe dislodgement and/or excessive creasing, because this would lead to a reduction in the protective properties. This is another reason why the protective material of the present invention retains its corresponding protective properties when subjected to use and/or deployment.

The present invention will now be described with reference to drawings/figures depicting preferred exemplary embodiments, while the observations made in this regard shall apply to all aspects of the invention and the corresponding preferred embodiments shall by no means have a limiting effect.

Figure 1B:
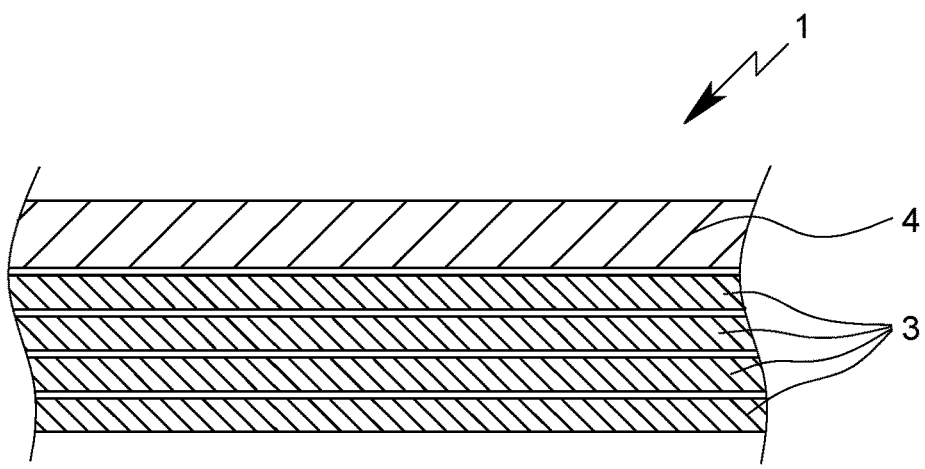
FIG. 1B shows a cross-sectional depiction through a protective material and/or a fragment protection element having a multi-ply construction and having a supplementary textile covering material.
Figure 1C:
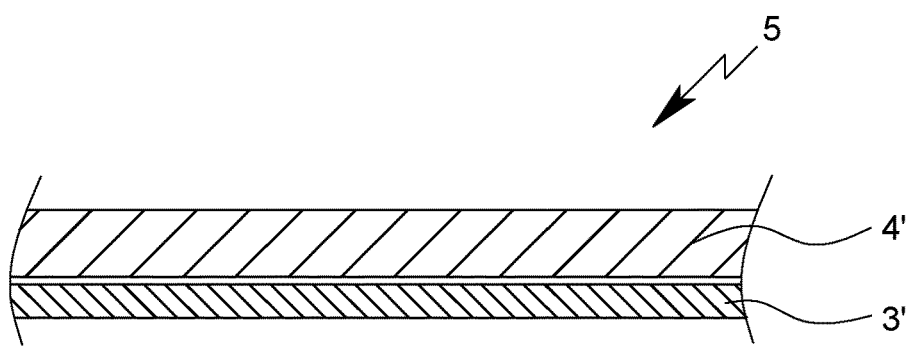
FIG. 1C shows a cross-sectional depiction through a supplementary fragment protection element which is in accordance with the present invention and having a single-ply construction and having a supplementary textile covering material and/or layer.
Figure 2A:
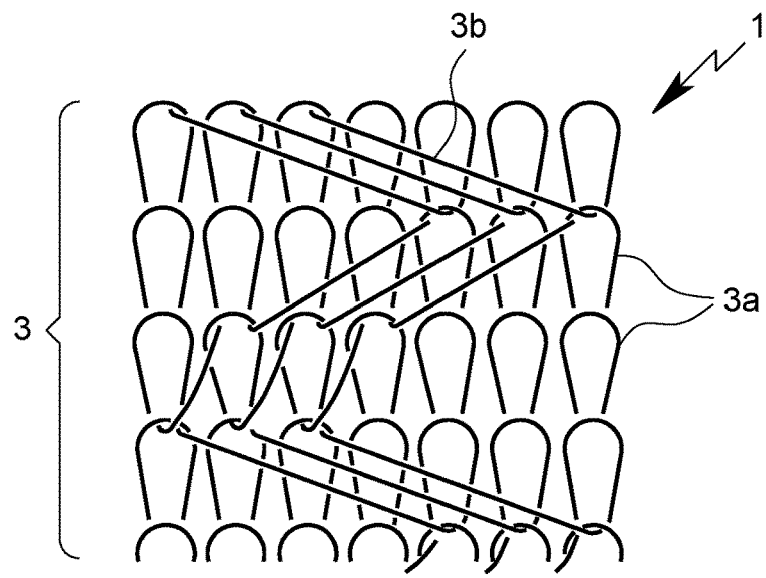
FIG. 2A shows a schematic depiction of the construction of a knitted textile fabric according to an embodiment of the present invention to form the protective material of the present invention and/or a supplementary fragment protection element, wherein the knitted textile fabric is configured as a loop-formingly knitted fabric having structural elements in the form of floats.
Figure 2B:
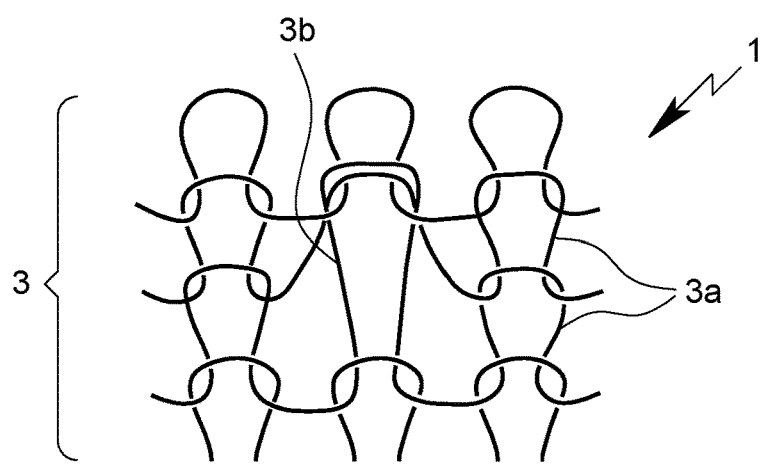
FIG. 2B shows a further schematic depiction of the construction of a knitted textile fabric deployed for the protective material and/or a supplementary fragment protection element and taking the form of a weft-knitted fabric produced with independently-movable needles according to an alternative embodiment of the present invention, wherein the structural elements further take the form of tuck loops.
Figure 2C:
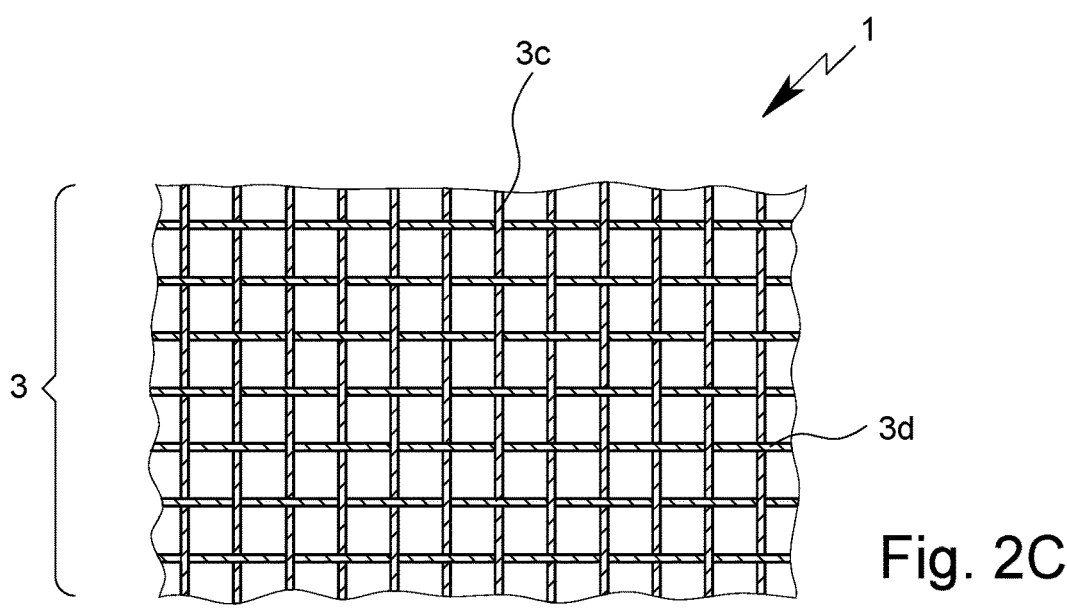
FIG. 2C shows a schematic depiction of the construction of a textile material deployed for the protective material and/or a supplementary fragment protection element and taking the form of a woven fabric having the corresponding warp threads and weft threads.
Figure 3A:
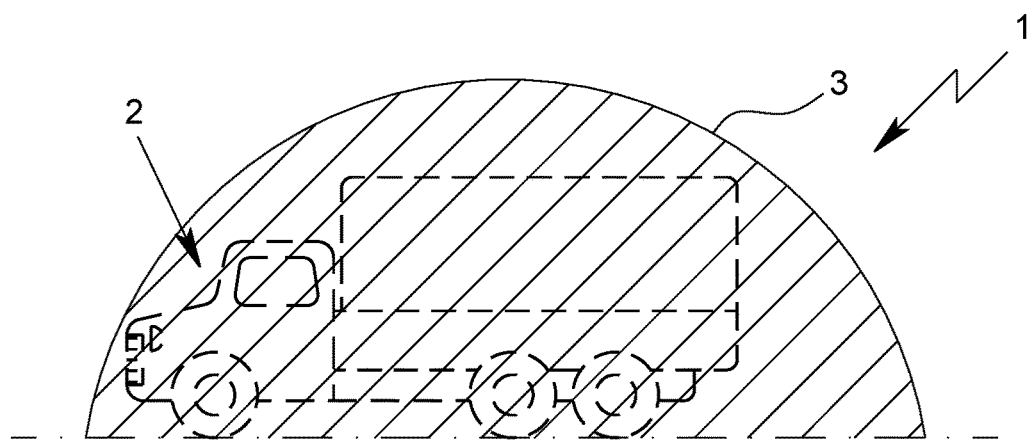
FIG. 3A shows a schematic depiction of a use example for the protective material according to the present invention, whereby an article to be protected and/or an object in the form of a transport vehicle is completely hidden under the protective material.
Figure 3B:
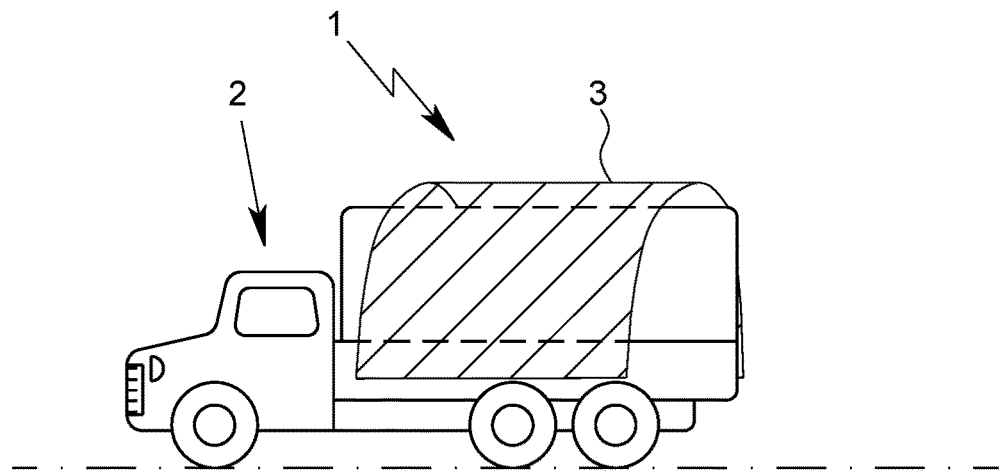
FIG. 3B shows a further use form for the protective material, whereby an article to be protected and/or an object in the form of a transport vehicle is sectionally endowed with the protective material.
Figure 3C:
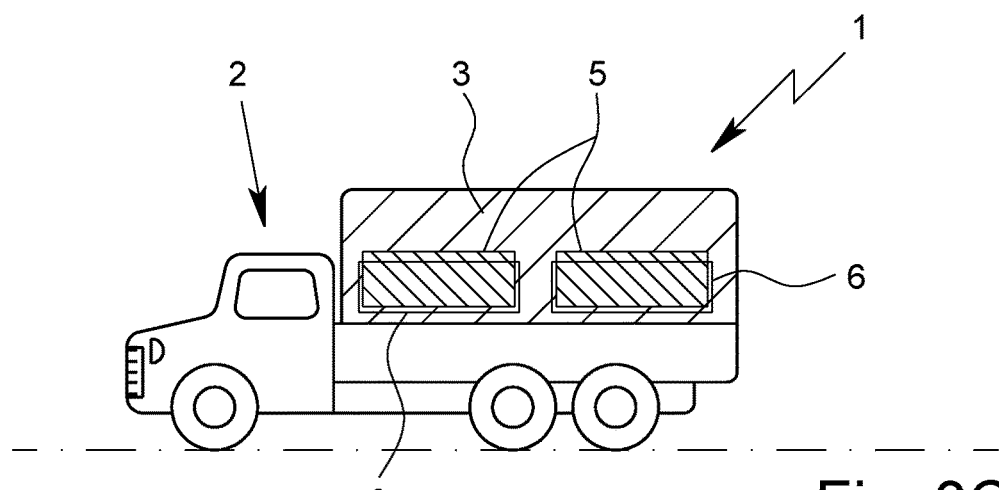
FIG. 3C shows a further schematic depiction of a use form for the protective material according to the present invention, whereby the protective material in the transportation vehicle object in the form of a covering tarpaulin is equipped with supplementary accommodating devices for accommodating supplementary fragment protection elements.
Figure 4A:
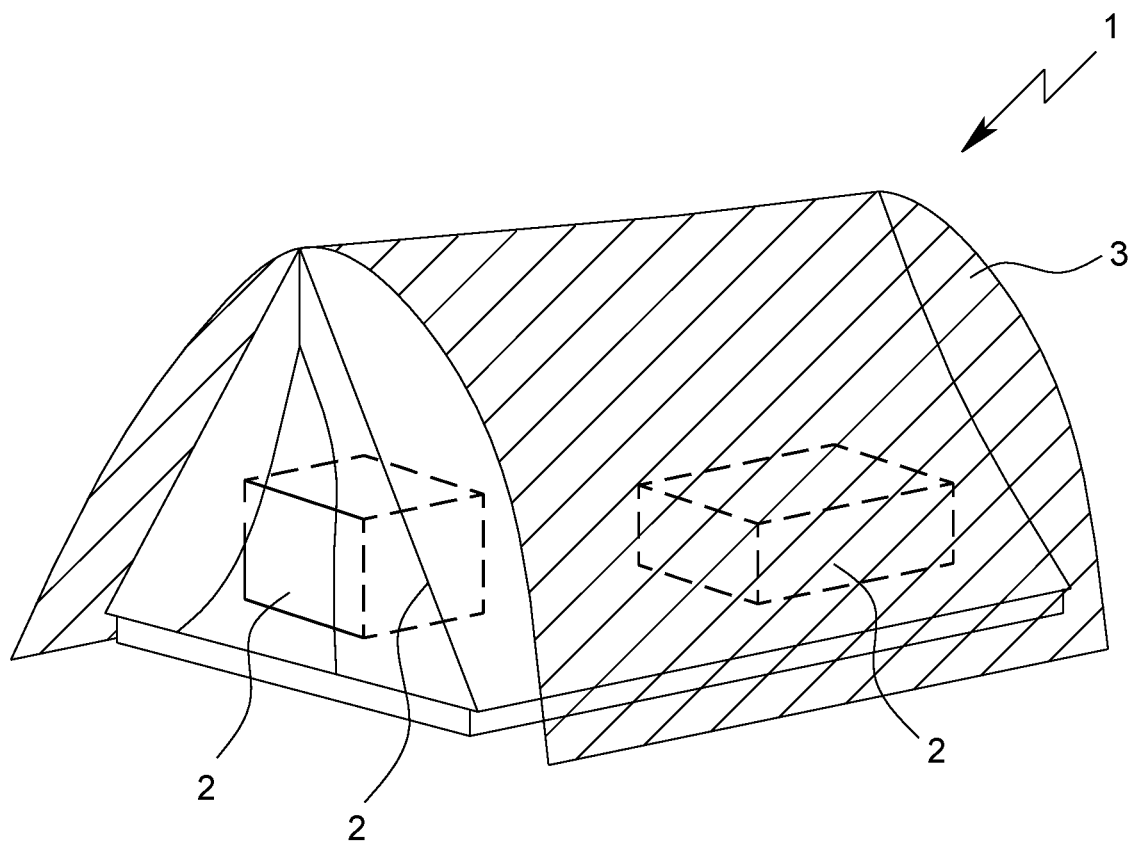
FIG. 4A shows a further schematic depiction of a use form for the protective material according to the present invention, whereby the protective material is deployed as an overthrow over a tent containing articles to be protected.
Figure 4B:
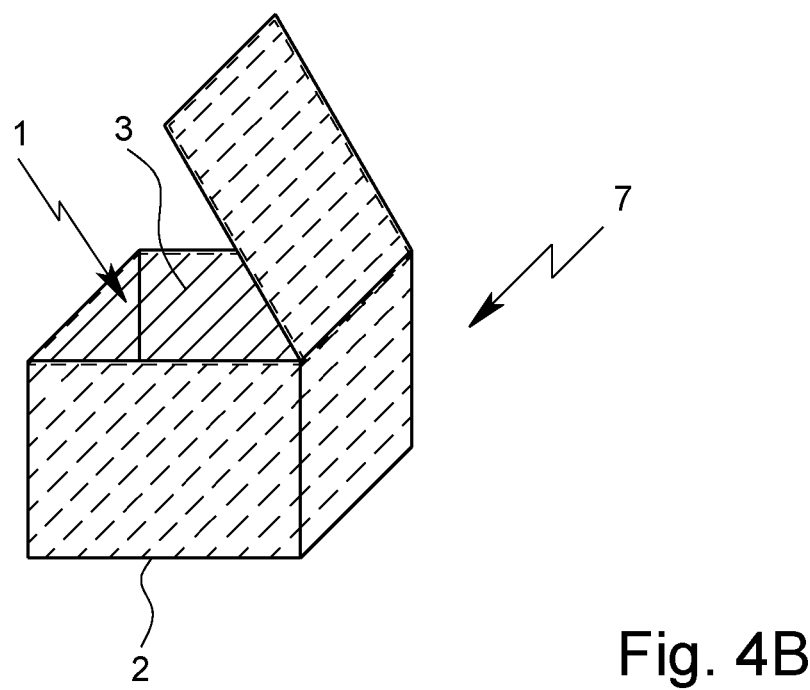
FIG. 4B shows a further schematic depiction of a use form for the protective material of the present invention whereby the protective material is deployed as an inliner for an article in the form of a receptacle or the like to obtain a protective material unit which is in accordance with the present invention.

In the drawings,

FIG. 1A shows a cross-sectional depiction through a protective material of the present invention and/or through a supplementary fragment protection element having a single-ply construction and having a supplementary textile covering material and/or layer;

FIG. 1B shows a cross-sectional depiction through a protective material and/or a fragment protection element having a multi-ply construction and having a supplementary textile covering material;

FIG. 1C shows a cross-sectional depiction through a supplementary fragment protection element which is in accordance with the present invention and having a single-ply construction and having a supplementary textile covering material and/or layer;

FIG. 2A shows a schematic depiction of the construction of a knitted textile fabric according to an embodiment of the present invention to form the protective material of the present invention and/or a supplementary fragment protection element, wherein the knitted textile fabric is configured as a loop-formingly knitted fabric having structural elements in the form of floats;

FIG. 2B shows a further schematic depiction of the construction of a knitted textile fabric deployed for the protective material and/or a supplementary fragment protection element and taking the form of a weft-knitted fabric produced with independently-movable needles according to an alternative embodiment of the present invention, wherein the structural elements further take the form of tuck loops;

FIG. 2C shows a schematic depiction of the construction of a textile material deployed for the protective material and/or a supplementary fragment protection element and taking the form of a woven fabric having the corresponding warp threads and weft threads;

FIG. 3A shows a schematic depiction of a use example for the protective material according to the present invention, whereby an article to be protected and/or an object in the form of a transport vehicle is completely hidden under the protective material;

FIG. 3B shows a further use form for the protective material, whereby an article to be protected and/or an object in the form of a transport vehicle is sectionally endowed with the protective material;

FIG. 3C shows a further schematic depiction of a use form for the protective material according to the present invention, whereby the protective material in the transportation vehicle object in the form of a covering tarpaulin is equipped with supplementary accommodating devices for accommodating supplementary fragment protection elements;

FIG. 4A shows a further schematic depiction of a use form for the protective material according to the present invention, whereby the protective material is deployed as an overthrow over a tent containing articles to be protected;

FIG. 4B shows a further schematic depiction of a use form for the protective material of the present invention whereby the protective material is deployed as an inliner for an article in the form of a receptacle or the like to obtain a protective material unit which is in accordance with the present invention.

The drawings, especially FIGS. 1A and 1B and also 2A to 2C, illustrate particularly also the first aspect of the present invention that is in accordance with the present invention, whereby there is provided, to wit, a protective material 1, specifically textile type protective material having fragment, stab, cut, ballistic projectile and/or thrust protective performance, preferably for protecting and/or for covering or hiding and/or for lining articles 2, wherein the protective material 1 is configured as sheetlike and/or two-dimensional textile material 3, preferably in the form of a large-area coherent, specifically one-piece textile fabric, preferably in the form of a cover, of a cloth, of a sheet, of a blanket, of a tarpaulin, of a mat or the like, wherein the textile material 3 is configured and/or present as a woven fabric, as a non-crimp fabric, as a bonded textile fabric, in particular as a nonwoven fabric, as a loop-formingly knitted fabric or as a weft-knitted fabric produced with independently-movable needles, in particular as a knitted fabric, preferably as a weft-knitted fabric produced with independently-movable needles, and wherein the textile material 3 includes or consists of at least one ultra high molecular weight polyethylene (UHMW-PE), wherein the ultra high molecular weight polyethylene (UHMW-PE) is present as yarn and/or thread and/or strand, preferably filament yarn, and serves and/or is used to configure and/or constitute the protective material 1.

As noted above, the present invention lastingly reduces and/or even prevents the penetration of fragments, but also any damaging effect due to cutting and stabbing weapons and also of thrusting weapons in relation to the articles protected with the protective material, especially by virtue of the specific properties of the protective material according to the present invention and/or of the supplementary fragment protection elements, as additionally adduced hereinbelow.

The underlying article 2 protected in the concept of the present invention generally has a defined physical extent and/or a defined shape. Article 2 is further generally a technical article. Article 2 may additionally be a mechanical/electronic article. Article 2 may further be a civilian or military article, in particular a military article, preferably a technomilitary, mechanomilitary/electromilitary article. More particularly, article 2 to be protected according to the present invention may be such an article 2 as is selected from the group of military articles and military equipments, preferably from the group of military pieces of equipment and/or military equipments. More particularly, article 2 may be selected from the group of preferably military vehicles, machines, weapons, ammunition, spares, electronic articles, accessories, installations, facilities, outfits or the like. More particularly, the article may also comprise receptacles and/or accommodating containers, for example, accommodating containers for ammunition which may each be endowed with the protective material of the present invention on the inside surface for example.

In a nonlimiting manner, the article 2 to be protected and/or object 2 to be protected may comprise for example vehicles, such as (personnel carrying) transportation vehicles, storage containers, vessels, boxes, tents, groundsheets, tarpaulins, coverings, mobile walls, silos, tanks, box containers or the like. The article and/or object to be protected may similarly also be a building or the like. More particularly, the concept of the present invention may also be used to protect vehicle interiors and/or spaces in buildings in the appropriate manner. In general, the protective material of the present invention is useful for protection of objects, especially equipments, accessories, fittings, electronics, ammunition, sensitive facilities and installations. The protective material may similarly also be used as protection for the surroundings of objects where the underlying object is itself the target of for example an explosion/detonation, as is specifically the case with car bombs or the like (cf. FIG. 3A to 3C and also FIGS. 4A and 4B).

Protective material 1 of the present invention may further be adapted to the physical extent and/or the shape of article 2 in one embodiment of the present invention. The result is an altogether improved protective function.

The protective material 1 of the present invention is more particularly not configured as an apparel piece for persons. Accordingly, the present invention is focused on protection for articles/objects as such. In this, however, the invention provides that in a manner of a secondary benefit so to speak, persons are also protected, for example in the event that persons are present inside an article/object to be protected, as may be the case for example with occupants of a specifically military (personnel carrying) transportation vehicle.

The invention provides in general that the protective material 1 is particularly in its deployed and/or employed state arranged on the outside of article 2, for example in the manner of an overthrow, blanket, sheet, covering, casing, hood or the like (cf. FIG. 3A, 3B). The protective material may additionally at least partially cover/hide the article 2 (cf. in particular FIG. 3A, 3B, 3C, 4A).

The invention may additionally provide that the protective material 1 is reversibly/nondurably (nonpermanently), preferably detachably, connected to the article 2. This may be the case for example with configuring the protective material 1 as an overthrow or the like.

The invention may also provide that the protective material 1 according to the invention is integrated into the article 2. The invention may more particularly provide that the protective material 1 forms an at least partial and/or at least sectional lining for the article 2 to be protected (cf. FIG. 4B).

More particularly, therefore, the protective material 1 may also be present as a lining for the article 2 to be protected.

It may thus be provided according to the invention that the protective material 1 forms a lining for article 2.

More particularly, the protective material 1 in a special embodiment may be a constituent part of article 2.

In addition, in another special embodiment, the protective material 1 and the article 2 may form a unit.

The protective material 1 may in general connect more particularly firmly/durably (permanently) to article 2, in particular by stitching, welding, lamination and/or adhesion. More particularly, the protective material 1 may be connected at least essentially fully face-to-face to the article 2. In addition, the protective material 1 may be connected at least sectionally, especially punctuately, in line form/grid form to the article 2. For example, the protective material may be configured as door trim of for example (transportation) vehicles or the like.

Even for that embodiment of the invention wherein the protective material 1 is integrated into the article 2, the protective material may be connected to the article 2 in a reversible/nondurable manner.

Reversible connections generally come into consideration for the purposes of the present invention in the form of a zipper, touch and close and/or button connection for example.

The protective material 1 of the present invention is additionally notable for a high level of fragment/ballistic protection. The protective material 1 may in this context have a fragment and/or ballistic protection value $V_{50}$, determined as per STANAG 2920, of at least 180 m/s, especially at least 200 m/s, preferably at least 225 m/s, more preferably at least 250 m/s, yet more preferably at least 275 m/s, yet still more preferably at least 300 m/s, yet still even more preferably at least 325 m/s and most preferably at least 350 m/s. The protective material 1 according to the invention may more particularly have a fragment and/or ballistic protection value $V_{50}$, determined as per STANAG 2920, in the range from 180 m/s to 800 m/s, especially 200 m/s to 750 m/s, preferably 225 m/s to 700 m/s, preferably 250 m/s to 650 m/s, yet more preferably 275 m/s to 600 m/s, yet still more preferably 300 m/s to 550 m/s, yet still even more preferably 325 m/s to 525 m/s and most preferably 350 m/s to 525 m/s.

These STANAG 2920 $V_{50}$ ballistic protection values specified according to the present invention relate particularly to a determination by use of projectiles in the form of right circular cylinders (RCCs) having a projectile weight of 0.13 g. The $V_{50}$ ballistic protection values adduced as per STANAG 2920 are determined, in particular, at a temperature of (20±2°) C. and, in particular, at a relative humidity of (65±4)%.

This $V_{50}$ value refers more particularly to the velocity (m/s) at which, for a defined projectile and selected (test) material, the probability of the projectile causing the material to become perforated/penetrated is 0.5 (where 1 equals the maximum probability) or 50%. For further information, reference may be made to the corresponding standard as per STANAG 2920.

In this context, the high protective properties of the protective material according to the present invention are ensured by the invention specifying, at not less than 180 m/s, a high STANAG 2920 $V_{50}$ value which more particularly is attained even by the single-plied or mono-layered form of the protective material and/or of the fragment protection element 2 described in more detail below.

In a preferred embodiment of the present invention, the protective material 1 is configured and/or present as knitted textile fabric, especially as loop-formingly knitted fabric or weft-knitted fabric produced with independently-movable needles, preferably as weft-knitted fabric produced with independently-movable needles. In this context, the knitted fabric may include a multiplicity of loops 3a and a multiplicity of at least one other structural element 3b. Providing the protective material in the form of a knitted textile fabric has the advantage that the underlying textile sheet material is by virtue of its interlooped structure elastic, extensible and flexible, further improving the fit with regard to the article 2 to be protected but also rendering this embodiment of the protective material 1 being readily stowable and transportable. Owing to the high elasticity/extensibility, moreover, the protective properties are further improved, since the energy absorption behavior especially with regard to ballistic bodies and cutting/stabbing weapons is additionally improved.

Regarding the configuration of the protective material according to the invention and/or of textile material 3 as a knitted fabric, especially as a loop-formingly knitted fabric, reference may be made in this regard to specifically FIG. 2A and FIG. 2B.

The structural element 3b of the knitted fabric is advantageously for the purposes of the present invention selected from the group of tuck loop, float loop (float), inlay, partial insertion and filler thread, preferably tuck loop and float loop (float), and/or wherein the structural element is configured in the form of a tuck loop and/or float loop (float).

In this context, FIG. 2A shows the configuration of the structural elements in the form of float loops, while FIG. 2B depicts the configuration of the structural elements in the form of tuck loops. The deployment of specific structural elements 3b additionally improves the mechanical stability/integrity of the knitted textile fabric/material 3, entailing a further enhancement in ballistic protective performance.

The protective material 1 according to the present invention and/or the textile material 3 may be configured and/or present as knitted textile fabric, especially as loop-formingly knitted fabric or weft-knitted fabric produced with independently-movable needles, preferably as weft-knitted fabric produced with independently-movable needles. The knitted fabric may further include a basic structure selected from the group of pillar, tricot, cord, satin, velvet and atlas, wherein the knitted fabric includes a plain, rib or purl construction.

Particularly good results are generally also obtained according to the invention in respect of ballistic protection when the textile material 3 and/or the knitted textile fabric is present and/or configured as a weft-knitted fabric produced with independently-movable needles.

A plain construction has only reverse loops on one side and only face loops on the other side. A reverse loop side is characterized in that at the lower points of intermeshing the loop feet are above and the loop legs below the head of the preceding loop. By contrast, a face loop side is characterized in that at the lower points of intermeshing the feet are below and the legs above the head of the preceding loop. A rib structure has face loops on both sides of the fabric while the purl structure has predominantly reverse loops on both sides of the fabric.

In principle, the protective material 1 and/or the knitted textile fabric 3 may also be produced on a circular or flat-bed knitting machine with independently-movable needles and/or as warp-knitted fabric, or warp knit, and/or as weft-knitted fabric, or weft knit, produced with fixed needles, in particular as noted above.

As depicted in FIG. 2A and FIG. 2B, the invention may provide with regard to the formation of the knitted textile fabric 3 that the structural element 3b is selected from the group of tuck loop, float loop (float), inlay, partial insertion and filler thread, preferably tuck loop and float loop (float). More particularly, the structural element 3b may take the form of a float loop (float) and/or of a tuck loop. In this context, FIG. 2A shows the formation of the structural elements in the form of floats, while FIG. 2B shows the formation of the structural elements in the form of tuck loops. By using specific structural elements 3b, the applicant found that, completely surprisingly, the mechanical stability and/or integrity of the knitted textile fabric 3 is further improved, entailing a further enhancement in ballistic-protective performance.

More particularly, the protective material 1 or the knitted textile material 3 may be configured/present as a loop-formingly knitted fabric, especially a warp-knitted fabric and/or a fixed needle weft-knitted fabric, preferably a warp-knitted fabric. This is a way to yet further improve the ballistic protective function.

An alternative embodiment of the present invention may also provide that the protective material 1 or the textile material 3 is configured as a woven fabric, wherein the woven fabric includes a multiplicity of ends (warp threads) 3c and a multiplicity of picks (weft threads) 3d. FIG. 2C may be referenced in this regard.

Regarding the ultra high molecular weight polyethylene (UHMW-PE) deployed in the present invention to form the protective material 1 and/or the textile material 3 underlying the protective material 1, it is preferable for the purposes of the present invention for the UHMW-PE to be present as yarn and/or thread and/or strand, preferably filament yarn, especially for configuring and/or constituting the protective material 1 and/or especially for configuring and/or constituting the textile material 3 and/or especially for configuring and/or constituting the woven fabric, the non-crimp fabric, the bonded textile fabric, the loop-formingly knitted fabric or the weft-knitted fabric produced with independently-movable needles, especially the knitted fabric, preferably the weft-knitted fabric produced with independently-movable needles, and/or especially for configuring and/or constituting the knitted textile fabric, preferably for configuring the loops 3a and/or the structural elements 3b, preferably the loops 3a and the structural elements 3b, of the knitted textile fabric, and/or especially for configuring and/or constituting the woven fabric, preferably for configuring the ends and/or picks of the woven fabric. In one particular embodiment of the present invention, the protective material 1 or the textile material 3 includes the ultra high molecular weight polyethylene (UHMW-PE) in an amount ranging from 25 wt % to 100 wt %, especially 50 wt % to 99.5 wt %, preferably 75 wt % to 99 wt %, more preferably 80 wt % to 95 wt %, based on the protective material 1 or the textile material 3.

In general, the deployment of yarns is preferred for the purposes of the present invention. Filament yarns moreover are notable for a particularly high level of strength, entailing a further improvement in the ballistic protective properties.

The present invention may provide in principle that the needle loops 3a and/or the structural elements 3b are each independently formed from one yarn and/or thread and/or strand, preferably filament yarn or wherein the needle loops 3a and/or the structural elements 3b are each independently formed from at least two yarns and/or at least two threads and/or at least two strands, preferably filament yarns. In addition, the ends and/or picks may each independently be formed from one yarn and/or thread and/or strand, preferably filament yarn. It may also be provided that the ends and/or picks are each independently formed from at least two yarns and/or at least two threads and/or at least two strands, preferably filament yarns. As noted above, the yarn/strand/thread includes or consists of the abovementioned UHMW-PE.

In other words, therefore, the invention may provide that the ultra high molecular weight polyethylene (UHMW-PE) be configured/arranged as loop-forming threads and, respectively, as warp threads and/or weft threads. It may more particularly be provided that the ultra high molecular weight polyethylene (UHMW-PE) be configured/arranged as structural element, specifically selected from the group of float loop (float), tuck loop, inlay, filler thread and partial insertion.

In this context, particular yarns/threads/strands may each consist of the same material. It is similarly also possible in the context of the present invention for the particular yarns/threads/strands to consist of mutually different materials, in which case the materials adduced hereinafter are deployable in this regard. Further material-related properties may thereby be provided in a precise manner, for example with regard to the provision of fire and/or flame retardant properties or the like.

The present invention may further provide that the yarn and/or the thread and/or the strand, in particular the filament yarn, includes a plurality of (individual) filaments. In this context, the yarn and/or the thread and/or the strand, in particular the filament yarn, may include or consist of at least two, especially at least three and preferably at least four (individual) filaments and up to 800 (individual filaments). In addition, the (individual) filaments may each independently have a diameter in the range from 5 μm to 50 μm, in particular from 6 μm to 40 μm, preferably from 8 μm to 30 μm, more preferably from 10 μm to 25 μm.

In this context, a high number of filaments leads to a further enhancement of ballistic stability. More particularly, a high number of filaments in the yarn leads to a further stabilization of the material produced therefrom, in particular—without wishing to be tied to this theory—since impacting kinetic energy can be absorbed and removed to an improved degree, serving to improve the stopping of penetrating objects in the form of fragments.

The present invention may further provide that the yarn and/or the thread and/or the strand, in particular the filament yarn, is twisted in the Z-direction or in the S-direction, preferably in the Z-direction. In particular, the yarn/thread/strand may be twisted at a yarn, thread and/or strand twist in the range from 50 T/m to 180 T/m (turns per meter), preferably from 60 T/m to 150 T/m, preferably from 70 T/m to 125 T/m, more preferably from 75 T/m to 110 T/m. In this context, the applicant found that, completely surprisingly, the above-recited ranges regarding the twist lead to an optimization of ballistic-protection properties, in particular since it is also on this basis—without wishing to be tied to this theory—that an optimized transportation of energy and/or an optimal distribution of kinetic energy imported by the impact of fragments is ensured.

The yarn deployed for the protective material 1 and/or the textile material 3 and/or the thread and/or the strand in this regard, particularly based on ultra high molecular weight polyethylene (UHMW-PE), should additionally have the following properties for the purposes of the present invention:

In particular, the yarn and/or the thread and/or the strand, in particular the filament yarn, should have a linear density in the range from 50 to 500 dtex, in particular from 75 to 450 dtex, preferably from 100 to 400 dtex, more preferably from 110 to 300 dtex.

In addition, the yarn and/or the thread and/or the strand, in particular the filament yarn, should have a diameter in the range from 4 μm to 250 μm, in particular from 6 μm to 200 μm, preferably from 8 μm to 150 μm, more preferably from 10 μm to 100 μm.

Similarly, the yarn and/or the thread and/or the strand, in particular the filament yarn, should have a tenacity in the range from 2 N/tex to 8 N/tex, in particular from 2.5 N/tex to 6 N/tex, preferably from 3 N/tex to 5 N/tex.

The invention may additionally provide that the yarn and/or the thread and/or the strand, in particular the filament yarn, has an elasticity modulus in the range from 50 N/tex to 300 N/tex, in particular from 75 N/tex to 250 N/tex, preferably from 100 N/tex to 200 N/tex.

The yarn and/or the thread and/or the strand, in particular the filament yarn, should additionally have a breaking extension in the range from 0.5% to 10%, in particular from 1% to 8%, preferably from 1.5% to 6%, more preferably from 2% to 5%, yet more preferably from 3% to 4%.

Similarly, the yarn and/or the thread and/or the strand, in particular the filament yarn, should have a mass density in the range from 800 kg/m$^3$ to 1200 kg/m$^3$, in particular from 800 kg/m$^3$ to 1200 kg/m$^3$, preferably from 850 kg/m$^3$ to 1100 kg/m$^3$, more preferably from 900 kg/m$^3$ to 1050 kg/m$^3$, yet more preferably from 950 kg/m$^3$ to 1000 kg/m$^3$.

In addition, the yarn and/or the thread and/or the strand, in particular the filament yarn, should have a crystallinity in the range from 70% to 95%, in particular from 75% to 90%, preferably from 80% to 85%. In particular, the yarn and/or the thread and/or the strand, in particular the filament yarn, should have a crystallinity of at most 95%, in particular at most 90%, preferably at most 85%. The crystallinity values relate in particular to the underlying ultra high molecular weight polyethylene (UHMW-PE).

The present invention may further provide that protective material 1 is endowed with at least one further material, in particular in the form of a yarn and/or thread and/or strand, other than ultra high molecular weight polyethylene (UHMW-PE) and/or wherein the yarn and/or the thread and/or the strand, in particular the filament yarn, is endowed with at least one further material, in particular filament, other than ultra high molecular weight polyethylene (UHMW-PE), in particular to form antimicrobial and/or biostatic, elastic, hydrophilic, fire-resistant and/or flame-resistant properties.

Thus, the protective material 1 or the textile material may include at least one material other than ultra high molecular weight polyethylene (UHMW-PE), particularly in the form of a yarn and/or thread and/or strand, in particular filament yarn.

In this context, the material, in particular the yarn and/or the thread and/or the strand or the filament, other than ultra high molecular weight polyethylene (UHMW-PE) may be selected from the group of natural products and synthetic products, in particular silk, cotton, wool, linen, elastane, modacrylic, aramid, in particular meta-aramid, and mixtures thereof. The content of material, in particular in the form of yarn and/or thread and/or strand or filament, other than ultra high molecular weight polyethylene (UHMW-PE) may be in the range from 1 wt % to 60 wt %, in particular from 2 wt % to 55 wt %, preferably from 5 wt % to 50 wt %, more preferably from 10 wt % to 40 wt %, based on the knitted textile fabric 3.

With regard to the yarns/threads/strands employed according to the present invention that are based on ultra high molecular weight polyethylene (UHMW-PE), commercially available products are employable. It is more particularly possible to employ corresponding products available under the designation Dyneema®. It is additionally also possible to employ products commercially offered for sale under the designation SPECTRA® 2000.

It is additionally advantageous for the purposes of the present invention when the protective material 1 and/or the textile material 3 underlying the protective material 1 is endowed with the material other than ultra high molecular weight polyethylene (UHMW-PE), especially yarn and/or thread and/or strand, to configure mutually different (major) faces and/or surfaces of the textile type protective material 1 and/or of the textile material underlying the protective material 1. More particularly, the protective material 1 or the textile material 3 underlying the protective material 1 may have mutually different (major) faces and/or surfaces. In this context, the protective material 1 or the textile material 3 underlying the protective material 1 may include the ultra high molecular weight polyethylene (UHMW-PE) at least essentially on the (major) face pointing toward the article/object in the employed state and/or on the inner face of the protective material 1 and/or of the textile material 3 underlying the protective material 1. In addition, the protective material 1 or the textile material 3 underlying the protective material 1 may include the material other than ultra high molecular weight polyethylene (UHMW-PE), in particular meta-aramid, at least essentially on the (major) face pointing away from the article/object in the employed state and/or on the outside face of the protective material 1 and/or of the textile material 3 underlying the protective material 1.

Endowing the protective material 1 or textile material 3 underlying the protective material 1 with specific (material-related) properties, such as, in particular, antimicrobial/biostatic, hydrophilic, fire-resistant and/or flame-resistant properties, may also be effected via application of corresponding substances which for this purpose are well known to a person skilled in the art, for example by spraying, dipping or the like. More particularly, a surface modification via plasma treatment or the like is also a possibility. For example, on the basis of the aforementioned methods in particular, the protective material 1 or the textile material 3 underlying the protective material 1 may also be endowed with oleophobic and/or oleophilic properties in a precise manner.

The term "inside face" here relates particularly to that face of the protective material 1 and/or of the textile material 3 underlying the protective material 1 which in the employed state points toward the article/object, while the term "outside face" relates particularly to that side of the protective material 1 or of the textile material 3 underlying the protective material 1 which in the employed state points away from the article/object.

Thereby it is possible to provide additional, material-specific properties that complement the fragment protection, such as fire/flame-resistant properties and/or a specific coloration/camouflaging of the material, in which case side/surface-specific properties are realizable in this connection, and that without degrading the ballistic-protective function to any significant extent. The production of such materials in the form of protective material 1 or textile material 3 underlying protective material 1 having mutually different surficial properties on the basis of using different yarns, threads or strands, is realizable in a manner known per se to a person skilled in the art, for example by employing circular weft-knitting machines with independently-movable needles to form a specific type of needle-loop construction or the like.

The properties of the protective material 1 or textile material 3 underlying protective material 1 are also altogether open to be varied/custom-tailored via the needle-loop construction chosen for the underlying weft knit produced with independently-movable needles. In particular, it is possible to increase the yarn, thread and/or strand thickness or employ a multiple type of yarn, thread and/or strand system in order, for example, to further densify the sheet structure. As noted above, it is possible to use two or more yarns, threads and/or strands made of different base materials. It is additionally also possible to use additional plating strands.

On the basis of the aforementioned measures, for example, the ballistic protective properties are also improvable in a specific manner and what is more the material may be endowed with fire/flame retardant properties for example.

As noted above, yarns/threads/strands based on modacrylic and/or meta-aramid are employable in order to optimize the flame and heat resistance. Moreover, wool and/or cotton yarns and/or threads and/or strands are employable in order to improve the ability to absorb moisture/perspiration and/or to provide an additional form of thermal insulation.

It is advantageous for the purposes of the present invention when the protective material 1 has a basis weight in the range from 75 g/m² to 1500 g/m², especially 100 g/m² to 1000 g/m², preferably 125 g/m² to 750 g/m² and more preferably 150 g/m² to 500 g/m².

More particularly, the protective material 1 according to the invention should be configured to be gas pervious, especially air pervious. Preferably, the protective material 1 should have an air transmission rate, as determined to DIN ISO 9237 and at a pressure of 200 pascals, of at least 500 l/m²·min, especially at least 1000 l/m²·min, preferably at least 2000 l/m²·min, more preferably at least 3000 l/m²·min, yet more preferably at least 4000 l/m²·min and most preferably at least 5000 l/m²·min.

In addition, the protective material 1 should be configured to be water vapor pervious. In this connection, the protective material 1 should have a water vapor transmission rate at 20° C. of at least 20 l/m² per 24 h, especially 30 l/m² per 24 h, preferably at least 40 l/m² per 24 h and more preferably at least 50 l/m² per 24 h.

The water vapor transmission rate may be measured in particular by the inverted cup method of ASTM E 96 and at 20° C. (regarding further details concerning the measurement of water vapor transmission cf. also McCullough et al. "A comparison of standard methods for measuring water vapour permeability of fabrics" in *Meas. Sci. Technol.* [*Measurements Science and Technology*] 14, 1402-1408, August 2003). This ensures a particularly high wearing comfort, since perspiration is removed in an effective manner.

The protective material 1 should additionally have a water vapor transmission resistance $R_t$ under steady state conditions at 20° C. of at most 20 (m²·pascal)/watt, especially at most 15 (m²·pascal)/watt, preferably at most 10 (m²·pascal)/watt and more preferably at most 5 (m²·pascal)/watt.

In this context, the protective material 1 may additionally have a water vapor transmission resistance $R_t$ under steady state conditions at 20° C. of at most 20 (m²·pascal)/watt, especially at most 15 (m²·pascal)/watt, preferably at most 10 (m²·pascal)/watt and more preferably at most 5 (m²·pascal)/watt. The water vapor transmission resistance $R_t$ may be measured in particular to DIN EN 31 092:1993 or the identical international standard ISO 11092 of February 1994 ("Textiles—Physiological Effects, Measurement of Thermal and Water-Vapor Resistance Under Steady-State Conditions (sweating guarded-hotplate test)").

In general, the protective material 1 according to the invention should have a thickness in the range from 0.05 mm to 50 mm, especially 0.1 mm to 25 mm, preferably 0.2 mm to 15 mm, more preferably 0.3 mm to 10 mm, yet more preferably 0.4 mm to 5 mm and most preferably 0.5 mm to 3 mm. For the purposes of the present invention, the size/area of the protective material 1 according to the invention may vary between wide limits, particularly with regard to and/or in the context of adapting to the article 2 to be protected and/or the object to be protected. More particularly, the protective material 1 may have an area and/or extension, based on the main extension plane of protective material 1, in the range from 0.001 $m^2$ to 200 $m^2$, especially 0.005 $m^2$ to 150 $m^2$, preferably 0.01 $m^2$ to 100 $m^2$, more preferably 0.05 $m^2$ to 50 $m^2$ and yet more preferably 0.1 $m^2$ to 20 $m^2$.

The protective material 1 according to the invention or the textile material 3 deployed for this purpose, especially the textile material 3, may display on at least one (major) face of the protective material 1, especially of the sheetlike and/or two-dimensional textile material 3, rib-shaped elevations, preferably longitudinal ribs. These rib-shaped elevations, especially the longitudinal ribs, may extend in an at least essentially straight line and/or mutually parallel arrangement. These rib-shaped elevations may be formed in particular in the course of the production of the protective material and/or textile material 3 on the basis of a specific needle loop construction. The corresponding methods of production are well known to a person skilled in the art, so no further exposition is required in this regard.

The protective material 1 of the present invention or the textile material 3 deployed for this purpose additionally has further positive properties also benefiting the durable provision of an effective fragment protective function and/or of a supplementary stab/cut protection and also thrust protection. This is because the protective material 1 or the textile material 3 has altogether hydrophilic properties, providing in combination with the abovementioned high air and/or water vapor transmission rate an effective way to transport moisture away from an article to be protected, as is advantageous for example with regard to electronic as well as other instruments. In addition, the underlying materials are antimicrobial/biostatic to ASTM E-2149-C and also perspiration-fast to DIN EN ISO 105 E04. The materials are further at least essentially inert to ammonia. The materials deployed for the purposes of the present invention further evince a high degree of launderability in that even after 20 washing cycles at a temperature of 60° C. there is no significant impairment to the material. In addition, the materials also have short drying times/periods. The materials are further altogether thermally stable in that even after storage at 70° C. for 24 hours there is no sustained impairment to the materials' properties.

Owing to the outstanding properties of the materials deployed for the protective material 1 and for the textile material 3 there is no need—in fundamental contradistinction to the prior art, where para-aramids are chiefly deployed to ensure a certain level of protective function—to insert/seal the materials providing the protective function into air and/or water impervious and/or UV nontransmitting foils. The materials deployed according to the present invention, by contrast, have outstanding properties, including particularly in respect of the air perviousness and hydrophilicity of the materials and also the great durability and chemical resistance of the materials.

As depicted in FIG. 1A, the protective material 1 according to the invention may especially with regard to the textile material 3 be configured, at least sectionally, preferably completely and/or across its entire area, to be single ply. In this context, the protective material 1 may include one ply of the sheetlike/two-dimensional textile material 3.

As further depicted in FIG. 1B, it may also be provided according to the invention that the protective material 1 is configured, at least sectionally, preferably completely and/or across its entire area, to be multi-ply and/or as a laminate. In this context, the protective material 1 may include a plurality of plies, especially two, three, four, five, six, seven, eight or more plies, of the sheetlike and/or two-dimensional textile material 3. In this regard, the particular plies based on the textile material 3 may differ in configuration, for example as regards material thickness or the like. The precise use of specifically sectionally multi-ply structures may individually adapt and/or increase a precise enhancement of the protective function especially with regard to particularly at-risk regions of an article to be protected.

In one particular embodiment, the particular plies of the sheetlike/two-dimensional textile material 3 are arranged in stack form and/or plane parallel to each other.

In this context, the particular plies of textile material 3 may be loosely stacked atop each other. For the purposes of the present invention, however, it is advantageous for at least some of the plies and preferably all the plies of textile material 3 to be connected to each other. An edge-sided connection in particular comes into consideration in this regard. The connection of the particular plies of textile material 3 may be effected in a manner known per se to a person skilled in the art, for example by stitching, welding, tacking, adhesion, lamination or the like, preferably by stitching, for example in the form of flat seams or the like. It may be provided for this purpose that the plies of textile material 3 are connected, particularly stitched, to each other, in particular edge-sidedly and/or linearly along the (major) faces of the particular ply.

It may further be provided in the context of the present invention that the protective material 1 includes at least two specifically successive plies of the sheetlike and/or two-dimensional textile material 3 arranged and/or aligned twisted relative to each other, in particular at an angle in the range from 45 to 90°, preferably at an angle of about 90°, relative to the (major) faces of the particular plies and/or relative to the alignment of the loops and/or ends and/or picks underlying the sheetlike and/or two-dimensional textile material 3 and/or relative to the rib-shaped elevations on the particular plies of the sheetlike and/or two-dimensional textile material 3. In this context, therefore, an arrangement of the particular plies in cross-ply with regard to the direction of the knitted stitches (in the form of courses in warp-knitted fabric for example) and/or with regard to the above-described rib-shaped elevations in textile material 3 is particularly advantageous. This further improves functionality in relation to the provision of fragment protection in particular.

It may additionally be provided for the purposes of the present invention that the protective material 1 includes at least one covering material 4 and/or a covering layer 4, preferably in the form of a textile sheet material, in particular wherein the covering material 4 is disposed in the employed state on that side facing away from article 2.

More particularly, a both-sided arrangement of a covering material 4 with respect to the protective material 1 is realizable according to the invention independently of each other. The protective material 1 according to the invention may thereby be configured to have further properties. More particularly, the covering material 4 may be configured in the form of camouflage, so the protective material 1 will in addition to the above-described protective function also evince a corresponding camouflaging function. FIG. 1A and FIG. 1B may also be referenced for this.

One embodiment of the present invention may provide for this that the covering material 4 is configured as woven, knitted, non-crimp or bonded textile fabric, especially as woven or knitted fabric. It may be provided in this context that the covering material 4 has a basis weight in the range from 50 g/m$^2$ to 500 g/m$^2$, especially 75 g/m$^2$ to 300 g/m$^2$ and preferably 100 g/m$^2$ to 300 g/m$^2$. It may similarly be provided that the covering material 4 is configured to be gas pervious, especially air pervious and/or water vapor pervious.

The covering material 4 may be configured to be fire resistant and/or flame resistant for example. In this context, the covering material 4 may include at least one fire resistant and/or flame resistant material, particularly in the form or as a constituent part of a yarn and/or thread and/or strand, preferably filament yarn. In this context, the fire resistant and/or flame resistant material may be at least one aramid, especially meta-aramid. More particularly, the proportion of fire resistant and/or flame resistant material may be in the range from 1 wt % to 100 wt %, especially 2 wt % to 90 wt %, preferably 5 wt % to 80 wt % and more preferably 10 wt % to 60 wt %, based on the covering material 4.

A further embodiment of the present invention that is in accordance with the present invention may provide that protective material 1 includes and/or is endowed with at least one (additional) fragment protection element 5. In this context, the fragment protection element 5 is connected, especially stitched, welded, laminated and/or adhered, firmly/durably (permanently) to the protective material 1. It may also be provided according to the present invention that the fragment protection element 5 is connected releasably and/or removably and/or detachably to the protective material 1. FIG. 3C may also be referenced for this purpose. In principle, the fragment protection element may in terms of its selected materials and its construction correspond to fragment protection 1 of the present invention and/or the textile material 3, so the above observations may also be referenced. More particularly, the fragment protection layer 5 may include at least one sheetlike/two-dimensional textile material 3' corresponding to the textile material 3 adduced above for the protective material 1. In addition, the fragment protection layer 5 may include at least one covering material 4' corresponding to the covering material 4 adduced above for the protective material 1. FIG. 1C in particular may be referenced for this.

The precise deployment of additional fragment protection elements which equally include the fragment, stab, cut, ballistic projectile and/or thrust protective function underlying the protective material 1 according to the invention may be used to precisely adapt/enhance the protective function of the protective material according to the present invention. It is thus possible in the present invention to use the precise deployment of additional fragment protection elements to provide, beyond a basic protection whereby so to speak a foundational protection is provided, a supplementary, additional protection elevating altogether the overall protection level, particularly on the basis of supplementary fragment protection elements 5 that are individually attachable to and/or insertable into the protective material 1 of the present invention. Particularly at-risk regions of the article/object to be protected may be additionally protected on this basis for example (e.g., windows of transport vehicles or people-transporting regions of vehicles (cf. FIG. 3C)). The fragment protection element deployed for the purposes of the present invention in principle has comparable properties to the protective material 1 of the present invention. More particularly, the fragment protection element also includes a fragment, stab, cut, ballistic projectile and/or thrust protection and thus has a fragment, stab, cut, ballistic projectile and/or thrust protective function.

It may here be provided in the context of the present invention that the protective material 1 includes at least one accommodating device 6, especially an accommodating pocket/chamber, preferably at least one insertion pocket and/or chamber, preferably for accommodating at least one fragment protection element 5, particularly as defined above (cf. FIG. 3C). More particularly, the fragment protection element 5 may be configured to be insertable and/or stowable into/in the accommodating device 6, particularly the accommodating pocket. The fragment protection element 5 may thereby be brought into a precise arrangement in/on the protective material 1 according to the invention. FIG. 3C for example may be referenced in this regard. The accommodating device 6 of the protective material may be provided for example by a textile sheet material, especially as defined above. In a specifically multi-ply embodiment of protective material 1, the pocket may also be provided on the basis of an opening between the particular plies of protective material 1, especially in connection with a connection between the particular plies which delimits the accommodating device.

The fragment protection element 5 may further include a sheetlike/two-dimensional textile material 3', especially as defined above for textile material 3.

It may be particularly provided according to the present invention that the fragment protection element 5 has a single-ply configuration.

It may similarly also be provided in an alternative embodiment of the present invention that the fragment protection element 5 is configured to be multi-ply and/or as a laminate, in particular wherein the fragment protection element 5 includes a plurality of plies, especially two, three, four, five, six, seven, eight or more plies of the sheetlike and/or two-dimensional textile material 3'.

It may also be provided in this context that the particular plies of the sheetlike and/or two-dimensional textile material 3' are arranged in stack form and/or plane parallel to each other, and/or wherein the plies of the sheetlike and/or two-dimensional textile material 3' are connected, especially stitched and/or adhered, to each other, especially edge-sidedly and/or linearly along the (major) faces of the particular plies.

It may further also be provided according to the present invention that at least two specifically successive plies of the sheetlike and/or two-dimensional textile material 3' are arranged and/or aligned twisted relative to each other, in particular at an angle in the range from 45 to 90°, preferably at an angle of about 90°, relative to the (major) faces of the particular plies and/or relative to the alignment of the loops and/or ends and/or picks underlying the sheetlike and/or two-dimensional textile material 3' and/or relative to the rib-shaped elevations on the particular plies of the sheetlike and/or two-dimensional textile material 3'.

In addition, the fragment protection element may include at least one covering material 4' and/or at least one covering layer 4', particularly as defined above for the covering layer 4 of protective material 1.

To configure the protective material 1 of the present invention, it may additionally be provided that the protective material 1 is equipped and/or endowed with an adsorbent for chemical poison and/or warfare agent materials, in particular with a material based on activated carbon, preferably in the form of activated carbon corpuscles in granule form ("granulocarbon") or spherical form ("spherocarbon"). For this, a specifically discontinuously, preferably punctuately applied adhesive may be used to fix the adsorbent to the protective material 1 and/or the textile sheet material 3 and/or the covering material 4. The same applies mutatis mutandis to fragment protection element 5 and/or fragment protection layer 5.

The average diameter of the adsorbent particles, in particular of the activated carbon corpuscles, is preferably in the range from 0.01 to 2 mm, preferably in the range from 0.05 to 1 mm, more preferably in the range from 0.05 to 0.5 mm. The corpuscle sizes in question may be determined in particular on the basis of the method of ASTM D2862-97/04. In addition, the aforementioned quantities can be determined by methods of determination which are based on sieve analysis, on x-ray diffraction, laser diffractometry or the like. The particular methods of determination are well known as such to a person skilled in the art, so no further exposition is required in this regard.

It will further prove advantageous for the purposes of the present invention when the adsorbent particles, in particular the activated carbon corpuscles, are employed in an amount ranging from 20 to 250 g/m$^2$, in particular from 20 to 180 g/m$^2$, preferably from 30 to 130 g/m$^2$.

The activated carbon employed for the purposes of the present invention may further be generally obtainable by carbonization and subsequent activation of a synthetic and/or non-naturally based starting material, in particular based on organic polymers. In the context of the present invention, it has further been found to be particularly advantageous for the purposes of the invention to employ an activated carbon based on a very specific starting material in that, in a particularly preferred embodiment, the activated carbon employed for the purposes of the present invention is obtainable from a starting material based on organic polymers, in particular based on sulfonated organic polymers, preferably based on divinylbenzene-crosslinked polystyrene, more preferably based on styrene-divinylbenzene copolymers.

Regarding the activated carbon more preferably employed for the purposes of the present invention, obtained by carbonization and subsequent activation of the starting material based on organic polymers, the present invention may provide that the divinylbenzene content of the starting material is in the range from 1 wt % to 20 wt %, in particular from 1 wt % to 15 wt %, preferably from 1.5 wt % to 12.5 wt %, more preferably from 2 wt % to 10 wt %, based on the starting material.

The invention may further provide in this connection that the starting material is a specifically sulfonated and/or sulfo-containing ion exchange resin, in particular of the gel type.

The invention may provide in particular that a polymer-based spherical activated carbon (PBSAC) is used as activated carbon. In particular, the activated carbon may be a polymer-based spherical activated carbon (PBSAC).

The activated carbon employed is in principle obtainable according to known methods of the prior art. They more particularly comprise spherical sulfonated organic polymers, in particular on the basis of divinylbenzene-crosslinked polystyrene, being for this purpose carbonized and then activated to form the particular activated carbon, in particular as noted above. Further details in this regard may be reviewed for example in the printed publications DE 43 28 219 A1, DE 43 04 026 A1, DE 196 00 237 A1 and also EP 1 918 022 A1 and/or in the same patent family's co-member equivalent U.S. Pat. No. 7,737,038 B2, the respective content of which is fully incorporated herein by reference.

Activated carbons employed in the context of the present invention are generally commercially available/obtainable. It is more particularly possible to employ activated carbons as marketed for example by Blucher GmbH, Erkrath, Germany, or by AdsorTech GmbH, Premnitz, Germany.

The parametric data recited in the present case with regard to the underlying activated carbon used/employed in the context of the present invention are determined by means of standardized or explicitly reported methods of determination or by using methods of determination which are per se familiar to a person skilled in the art.

Especially the parametric data relating to the characterization of the porosity of the pore size distribution and other adsorptive properties are generally each obtained from the corresponding nitrogen sorption isotherm of the particular activated carbon and/or the products measured. In addition, the pore distribution, particularly also with regard to the micropore content in relation to the total pore volume, is determinable on the basis of DIN 66135-1.

It will additionally be found advantageous in the context of the present invention when the activated carbon employed for the purposes of the present invention has a more specificized total pore volume, in particular a Gurvich total pore volume, as adduced hereinbelow.

Namely, the present invention may provide that the activated carbon has a total pore volume, in particular a Gurvich total pore volume, in the range from 0.3 cm$^3$/g to 3.8 cm$^3$/g, in particular from 0.4 cm$^3$/g to 3.5 cm$^3$/g, preferably from 0.5 cm$^3$/g to 3 cm$^3$/g, more preferably from 0.6 cm$^3$/g to 2.5 cm$^3$/g, yet more preferably from 0.5 cm$^3$/g to 1.5 cm$^3$/g.

The Gurvich determination of total pore volume is a method of measurement/determination which is well known per se to a person skilled in the art. For further details regarding the Gurvich determination of total pore volume, reference may be made for example to L. Gurvich (1915), *J. Phys. Chem. Soc. Russ.* 47, 805, and also S. Lowell et al., Characterization of Porous Solids and Powders: Surface Area Pore Size and Density, *Kluwer Academic Publishers, Article Technology Series*, pages 111 ff. More particularly, the pore volume of activated carbon may be determined on the basis of the Gurvich rule as per the formula $V_P = W_d / \rho_1$, where $W_a$ is the adsorbed quantity of an underlying adsorbate and $\rho_1$ is the density of the adsorbate employed (cf. also formula (8.20) as per page 111, chapter 8.4) of S. Lowell et al.).

The present invention may provide in particular that at least 65%, in particular at least 70%, preferably at least 75%, more preferably at least 80% of the total pore volume, in particular of the Gurvich total pore volume, of the activated carbon is formed by pores having pore diameters of at most 50 nm, in particular by micro- and/or mesopores.

The present invention may similarly provide in particular that 50% to 95%, in particular 60% to 90%, preferably 70% to 85% of the total pore volume, in particular of the Gurvich total pore volume, of the activated carbon is formed by pores having pore diameters of at most 50 nm, in particular by micro- and/or mesopores.

The present invention may provide in particular that 1% to 60%, in particular 5% to 50%, preferably 10% to 40%, more preferably 15% to 35% of the total pore volume, in particular of the Gurvich total pore volume, of the activated carbon is formed by pores having pore diameters of more than 2 nm, in particular by meso- and/or macropores.

More particularly, the activated carbon may have a pore volume, in particular a carbon black micropore volume, formed by pores having pore diameters of at most 2 nm (i.e., ≤2 nm), in the range from 0.05 cm$^3$/g to 2.5 cm$^3$/g, in particular from 0.15 cm$^3$/g to 2 cm$^3$/g, preferably 0.3 cm$^3$/g to 1.5 cm$^3$/g, in particular wherein 15% to 98%, in particular 25% to 95%, preferably 35% to 90% of the total pore volume of the activated carbon is formed by pores having pore diameters of at most 2 nm, in particular by micropores.

The carbon black method of determination is known per se to a person skilled in the art; moreover, for further details of the carbon black method of determining the pore surface area and the pore volume, reference may be made for example to R. W. Magee, *Evaluation of the External Surface Area of Carbon Black by Nitrogen Adsorption, Presented at the Meeting of the Rubber Division of the American Chem. Soc., October* 1994, as cited in, for example: *Quantachrome Instruments, AUTOSORB-1, AS1 WinVersion* 1.50*, Operating Manual, OM,* 05061*, Quantachrome Instruments* 2004*, Florida, USA, pages* 71 *ff.* More particularly, a t-plot method may be used to analyze the data in this regard.

In addition, the activated carbon may have a specific BET surface area in the range from 600 m$^2$/g to 4000 m$^2$/g, in particular from 800 m$^2$/g to 3500 m$^2$/g, preferably from 1000 m$^2$/g to 3000 m$^2$/g, more preferably from 1200 m$^2$/g to 2750 m$^2$/g, most preferably from 1300 m$^2$/g to 2500 m$^2$/g.

Determining the specific surface area as per BET is in principle known per se to a person skilled in the art, so no further details need be provided in this regard. All BET surface areas reported/specified relate to the determination as per ASTM D6556-04. In the context of the present invention, the so-called Multi-Point BET method of determination (MP-BET) in a partial pressure range $p/p_0$ from 0.05 to 0.1 is used to determine the BET surface area in general and unless hereinbelow expressly stated otherwise.

In respect of further details regarding determination of BET surface area and regarding the BET method, reference can be made to the aforementioned ASTM D6556-04 and also to Römpp Chemielexikon, 10$^{th}$ edition, Georg Thieme Verlag, Stuttgart/New York, headword: "BET-Methode", including the references cited there, and to Winnacker-Küchler (3$^{rd}$ edition), volume 7, pages 93 ff. and also to Z. Anal. Chem. 238, pages 187 to 193 (1968).

In the context of the present invention, the term "micropores" refers to pores having pore diameters of less than 2 nm, whereas the term "mesopores" refers to pores having pore diameters in the range from 2 nm (i.e., 2 nm inclusive) up to 50 nm inclusive, and the term "macropores" refers to pores having pore diameters of more than 50 nm (i.e., >50 nm).

In particular, the activated carbon may have a surface area formed by pores having pore diameters of at most 2 nm, in particular by micropores, in the range from 400 to 3500 m$^2$/g, in particular from 500 to 3000 m$^2$/g, preferably from 600 to 2500 m$^2$/g, more preferably from 700 to 2000 m$^2$/g.

In particular, the activated carbon may have a surface area formed by pores having pore diameters in the range from 2 nm to 50 nm, in particular by mesopores, in the range from 200 to 2000 m$^2$/g, in particular from 300 to 1900 m$^2$/g, preferably from 400 to 1800 m$^2$/g, more preferably from 500 to 1700 m$^2$/g.

In particular, the activated carbon may have an average pore diameter in the range from 0.1 nm to 55 nm, in particular from 0.2 nm to 50 nm, preferably from 0.5 nm to 45 nm, more preferably from 1 nm to 40 nm.

By virtue of the purpose-directed deployment of an adsorptive material in the form of activated carbon in particular, the protective material of the present invention may, in addition to the fragment, stab, cut, ballistic projectile and/or thrust protection provided according to the present invention, be provided adsorptive properties, in particular with regard to the adsorption of chemical poison and/or warfare agent molecules, thereby providing altogether a protective material offering multiple protection (fragment protection and protection against poison and/or warfare agent molecules). Contamination of the articles to be protected is thereby effectively prevented.

The present invention further provides—in a further aspect of the present invention—the method of using a textile type protective material according to the invention, as defined above, for providing and/or enhancing a fragment, stab, cut, ballistic projectile and/or thrust protection for articles and/or for endowing articles with fragment, stab, cut, ballistic projectile and/or thrust protection, preferably for protecting and/or for covering or hiding and/or lining articles.

In this connection, the use method of the present invention may thus be directed to providing/bestowing/enhancing a protective function for articles and/or the protection of articles.

More particularly, the use method of the present invention may be provided for providing and/or bestowing and/or enhancing a protective function in relation to fragments caused and/or released by detonation and/or explosion. In respect of the use method of the present invention it may be further provided in the context of the present invention that the protective material is disposed between the article and the site of detonation and/or explosion. In addition, the protective material in its employed state may extend across the article and/or at least partly cover the article and/or at least partly line the article.

The present invention additionally further provides—in a further aspect of the present invention—a method of providing and/or enhancing a fragment, stab, cut, ballistic projectile and/or thrust protection for at least one article and of endowing at least one article with fragment, stab, cut, ballistic projectile and/or thrust protection, wherein at least one protective material as defined above is disposed between the article and the site of detonation and/or explosion, and/or wherein the protective material in its employed state extends across the article and/or at least partly covers the article and/or at least partly lines the article.

The method of the present invention thus targets a targeted enhancement of the protective function in relation to articles and/or protection of articles against fragments caused and/or released by detonation/explosion and/or for enhancing the fragment, stab, cut, ballistic projectile and/or thrust protection of articles.

The present invention finally further provides—in a further aspect of the present invention—the protective material unit 7 of the present invention, wherein the protective material unit 7 comprises at least one protective material 1, especially as defined above, and at least one article 1 endowed with the protective material 1 and/or at least partly covered with the protective material 1 and/or at least partly lined with the protective material 1. FIG. 4B in particular may be referenced in this regard.

Further versions, alterations, variations, modifications, special features and advantages of the present invention will be readily apparent to and realizable by the ordinarily skilled on reading the description without their having to go outside the realm of the present invention.

The present invention is illustrated by the following exemplary embodiments which, however, shall in no way limit the present invention.

Exemplary Embodiments (i) The ballistic protective function and/or the ballistic stopping power of the protective materials tested in the present complex of tests is determined by means of the ballistic protection value $V_{50}$ measured according to STANAG 2920 (RCC 0.13 g, where RCC=right circular cylinder). Higher $V_{50}$ values denote a superior ballistic protective function and/or stopping power on the part of the protective materials tested.

The protective materials in question are each present for the testing as a knitted textile fabric, the material of which in the case of the protective materials deployed according to the present invention is based on ultra high molecular weight polyethylene (UHMW-PE) and in the case of the comparative materials is based on para-aramid. The yarns deployed in this regard have a linear density of about 220 dtex for all the fragment protection elements tested. The knitted textile fabrics underlying the protective materials of the present invention and the comparative materials further each have a basis weight of about 290 g/m² (per ply of the knitted textile fabric).

The following tests are carried out in this context:

a) In a first complex of tests, the $V_{50}$ values of fragment protection elements based on UHMW-PE on the one hand and para-aramid on the other are determined as a function of the number of plies of the knitted textile fabric used for the particular materials. The $V_{50}$ values obtained for the UHMW-PE based material are more than 320 m/s for the single-ply material, more than 400 m/s for the two-ply material and more than 520 m/s for the five-ply material. The para-aramid based material yields corresponding inferior $V_{50}$ values of more than 170 m/s for the single-ply material, more than 210 m/s for the two-ply material and more than 390 m/s for the five-ply material.

b) In a second complex of tests, two-ply fragment protection elements based on UHMW-PE on the one hand and para-aramid on the other are subjected to a determination of the corresponding $V_{50}$ values following UV irradiation of the particular materials (following an irradiation period of one week). A $V_{50}$ value of more than 380 m/s results for the UHMW-PE based material. The para-aramid based material has a $V_{50}$ value of more than 120 m/s.

c) In a further complex of tests, finally, the corresponding $V_{50}$ values of two-ply materials based on UHMW-PE on the one hand and para-aramid on the other are determined following a heat treatment at a temperature of 70° C. (treatment period=24 h). A $V_{50}$ value of more than 395 m/s is obtained for the UHMW-PE based material. The para-aramid based material has a $V_{50}$ value of more than 200 m/s.

The results show that the UHMW-PE based protective materials used according to the present invention achieve altogether significantly higher $V_{50}$ values as compared with the tested materials based on para-aramid. It further transpires that the UHMW-PE based protective materials used according to the present invention have significantly better ballistic protective properties than para-aramid based materials even after a corresponding treatment (UV irradiation and heat treatment). The UHMW-PE based materials, moreover, versus the untreated materials exhibit but very minimal changes in the $V_{50}$ values, which illustrates the stability of the materials.

The tests in effect demonstrate the improved properties of protective materials based on UHMW-PE. The tests more particularly demonstrate that the UHMW-PE based material underlying the protective materials is UV-stable, moisture-resistant and additionally also thermally stable, so the ballistic protective function of such materials is not lastingly degraded even under extreme conditions.

The results thus altogether demonstrate the distinctly superior properties of the UHMW-PE based protective materials deployed according to the present invention over systems based on para-aramid.

2. In a further portion of tests, the influence of structural elements in the knitted textile material used to form the protective materials deployed according to the present invention is tested using single-ply materials based on UHMW-PE, the structural elements being present therein in the form of e) float loops and alternatively f) tuck loops. To determine the ballistic protective function, the corresponding ballistic protection values $V_{50}$ are measured/determined to STANAG 2920 (RCC 0.13 g). The $V_{50}$ value obtained is more than 380 m/s for structural elements in the form of float loops and more than 350 m/s for structural elements in the form of tuck loops.

The above results illustrate that the use of specific knitted textile fabrics to form the protective materials with the additional use of float loops or tuck loops as structural elements leads to a significant increase in the ballistic protective properties as indicated by correspondingly increased $V_{50}$ values. Particularly good results here are obtained when the structural elements are in the form of float loops.

3. A protective material used according to the present invention is also subjected to a flammability test.

In a first series of tests, a UHMW-PE based protective material used according to the present invention after covering with a textile covering layer based on a fire resistant material is subjected to a flammability test in accordance with DIN EN ISO 15025: 2002. The underlying plied construction, made up of fragment protection on the one hand and covering material on the other, is found to have a high resistance to heat/flames even after 10 seconds of direct flaming. The UHMW-PE material merely exhibits slight surficial discoloration. The material does not melt, drip, form holes or burn.

In a second series of tests, a single-ply material is investigated for flame resistance by using in this regard a knitted textile fabric displaying predominantly a UHMW-PE based yarn system on one side and/or a (major) face, while the (major) face opposite this side utilizes a yarn and/or a fiber species based on a meta-aramid. The material in question may have been produced in particular on a circular weft-knitting machine with independently-movable needles. Before being subjected to flaming as per the above-adduced standard, the underlying material has a $V_{50}$ value of about 290 m/s. After the predominantly meta-aramid (major) face of the material has been subjected to flaming, a $V_{50}$ value of 275 m/s can be determined. Therefore, the material combines good resistance to flaming with high performance in ballistic protective function.

The tests adduced altogether verify that the use of specific materials comprising a knitted textile fabric containing and/or formed from an ultra high molecular weight polyethylene in the manner of the present invention is a basis for particularly good ballistic protective properties resulting in the protective materials manufactured therewith, while the deployed materials are also highly stable in this regard.

LIST OF REFERENCE SIGNS 1 protective material
2 article/object
3 textile material, especially knitted or woven fabric, of the protective material
3' textile material of fragment protection element
3a knitted stitches
3b structural element
3c warp thread
3d weft thread
4 covering material/layer of protective material
4' covering material/layer of fragment protection element
5 fragment protection element
6 accommodating device
7 protective material unit

What is claimed is:

1. A textile ballistic protective material having at least one of fragment-protective, stab-protective, cut-protective, ballistic-projectile-protective, and thrust-protective resistance and intended for the purpose of protecting, covering, or lining articles,
wherein the protective material is configured as a sheet-like or two-dimensional textile material in the form of a large-areal coherent textile fabric, wherein the textile fabric is in the form of a cover, of a cloth, of a sheet, of a blanket, of a tarpaulin, or of a mat,
wherein the textile material is configured as a knitted textile fabric, wherein the knitted textile fabric includes a multiplicity of loops and a multiplicity of at least one other structural element different from loops and selected from the group consisting of handle loops (tuck loops), floats (float loops), inlays, partial inlays and filler threads, and wherein the textile material consists of at least one ultra high molecular weight polyethylene (UHMW-PE), wherein the ultra high molecular weight polyethylene (UHMW-PE) is present as a yarn, a thread or a strand and serves and is used to constitute the textile ballistic protective material.

2. The protective material as claimed in claim 1, wherein the protective material is configured as a one-piece textile fabric.

3. The protective material as claimed in claim 1, wherein the ultra high molecular weight polyethylene (UHMW-PE) is present as a filament yarn.

4. The protective material as claimed in claim 1, wherein the protective material has a fragment or ballistic protection value $V_{50}$, determined as per STANAG 2920, of at least 180 m/s.

5. The protective material as claimed in claim 1, wherein the protective material has a fragment or ballistic protection value $V_{50}$, determined as per STANAG 2920, in the range of from 180 m/s to 800 m/s.

6. The protective material as claimed in claim 1, wherein the protective material has a fragment or ballistic protection value $V_{50}$, determined as per STANAG 2920, in the range of from 200 m/s to 750 m/s.

7. The protective material as claimed in claim 1, wherein the protective material is configured as a loop-formingly knitted fabric or a weft-knitted fabric produced with independently-movable needles.

8. The protective material as claimed in claim 1, wherein the protective material is configured as a weft-knitted fabric produced with independently-movable needles.

9. The protective material as claimed in claim 1, wherein the structural element is selected from the group of handle loops and floats (float loops).

10. The protective material as claimed in claim 1, wherein the article is a technical, mechanical or electronic, civilian or military article.

11. The protective material as claimed in claim 1, wherein the article is selected from the group of military articles and military equipments.

12. The protective material as claimed in claim 1, wherein the protective material is not configured as an apparel piece for persons.

13. The protective material as claimed in claim 1, wherein the protective material is, in its use-state, arranged on the outside of the article.

14. A protective material unit, wherein the protective material unit comprises at least one protective material as defined in claim 1 and at least one article endowed with the protective material.

15. The protective material unit as claimed in claim 14, wherein the protective material at least partly covers or lines the article.

16. A method including the steps of disposing at least one protective material as defined in claim 1 between an article and a site of detonation or explosion and of providing the article with fragment-protection, stab-protection, cut-protection, ballistic-projectile-protection and thrust-protection.

17. The method as claimed in claim 16,
wherein the protective material, in its use-state, extends across the article or at least partly covers or lines the article.

18. A textile ballistic protective material having at least one of fragment-protective, stab-protective, cut-protective, ballistic-projectile-protective and thrust-protective resistance and intended for the purpose of protecting, covering or lining articles,
wherein the protective material is configured as a sheet-like or two-dimensional textile material in the form of a large-areal coherent textile fabric, wherein the textile fabric is in the form of a cover, of a cloth, of a sheet, of a blanket, of a tarpaulin, or of a mat,
wherein the textile material is configured as a knitted textile fabric, wherein the knitted textile fabric includes a multiplicity of loops and a multiplicity of at least one other structural element different from loops and selected from the group consisting of handle loops (tuck loops), floats (float loops), inlays, partial inlays and filler threads, and wherein the textile material consists of at least one ultra high molecular weight polyethylene (UHMW-PE), wherein the ultra high molecular weight polyethylene (UHMW-PE) is present as a yarn, a thread or a strand and serves and is used to constitute the textile ballistic protective material, wherein the ballistic protective material is not configured as an apparel piece for persons, and wherein the protective material has a fragment or ballistic protection value $V_{50}$, determined as per STANAG 2920, of at least 180 m/s.

19. A textile ballistic protective material having at least one of fragment-protective, stab-protective, cut-protective, ballistic-projectile-protective and thrust-protective resistance and intended for the purpose of protecting, covering or lining articles, wherein the protective material is configured as a sheet-like or two-dimensional textile material in the form of a large-areal coherent textile fabric, wherein the textile fabric is in the form of a cover, of a cloth, of a sheet, of a blanket, of a tarpaulin, or of a mat, wherein the textile material is configured as a knitted textile fabric, wherein the knitted textile fabric includes a multiplicity of loops and a multiplicity of at least one other structural element different from loops and selected from the group consisting of handle loops (tuck loops), floats (float loops), inlays, partial inlays and filler threads, and wherein the textile material consists of at least one ultra high molecular weight polyethylene (UHMW-PE), wherein the ultra high molecular weight polyethylene (UHMW-PE) is present as a yarn, a thread or a strand and serves and is used to constitute the textile ballistic protective material, wherein the ballistic protective material is not configured as an apparel piece for persons and wherein the article is a technical, mechanical or electronic, civilian or military article, and wherein the protective material has a fragment or ballistic protection value $V_{50}$, determined as per STANAG 2920, of at least 180 m/s.

* * * * *